(12) United States Patent
Pattok et al.

(10) Patent No.: US 7,725,227 B2
(45) Date of Patent: May 25, 2010

(54) METHOD, SYSTEM, AND APPARATUS FOR PROVIDING ENHANCED STEERING PULL COMPENSATION

(75) Inventors: Kathryn L. Pattok, Frankenmuth, MI (US); Terrence D. Smith, Bay City, MI (US); Ashok Chandy, Fenton, MI (US); Julie A. Kleinau, Bay City, MI (US); Jeff Zuraski, Saginaw, MI (US); Mark P. Colosky, Vassar, MI (US); Troy P. Strieter, Sebewaing, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 37 days.

(21) Appl. No.: 11/611,406

(22) Filed: Dec. 15, 2006

(65) Prior Publication Data

US 2008/0147276 A1 Jun. 19, 2008

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
*G05D 1/00* (2006.01)
*B62D 5/04* (2006.01)

(52) U.S. Cl. ........................................ 701/41; 180/443
(58) Field of Classification Search .................... 701/41
See application file for complete search history.

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kühnlein | 318/254 |
| 4,447,771 A | 5/1984 | Whited | 18/661 |

(Continued)

FOREIGN PATENT DOCUMENTS

| | | |
|---|---|---|
| DE | 2132950 | 11/1983 |
| DE | 19508607 C1 | 8/1996 |
| EP | 08 08 029 A2 | 11/1997 |
| EP | 0 821 468 A2 | 1/1998 |

(Continued)

OTHER PUBLICATIONS http://web.archive.org/web/20060719084753/http://en.wikipedia.org/wiki/Torque.*

(Continued)

*Primary Examiner*—Khoi Tran
*Assistant Examiner*—Nicholas Kiswanto
(74) *Attorney, Agent, or Firm*—Cantor Colburn LLP

(57) ABSTRACT

A method, system, and apparatus for providing enhanced steering pull compensation are provided. The method compensates for steering pull in a vehicle steering system that includes a handwheel. The method includes monitoring the vehicle to determine whether the vehicle is heading forward along a substantially linear straight-ahead path and, if so, measuring handwheel torque, as a sensed torque signal, to determine an amount of steering pull existing at the handwheel. The method also includes generating a torque assist signal in response to the sensed torque signal and calculating an offset signal for reducing the amount of steering pull to substantially zero. The method further includes producing a modified torque assist signal by adding the offset signal to the torque assist signal, and applying the modified torque assist signal to the vehicle steering system.

16 Claims, 13 Drawing Sheets

U.S. PATENT DOCUMENTS

| | | | |
|---|---|---|---|
| 4,509,611 A | 4/1985 | Kade et al. | 180/446 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,672,253 A | 6/1987 | Tajima et al. | 310/269 |
| 4,686,437 A | 8/1987 | Langley et al. | 318/254 |
| 4,688,655 A | 8/1987 | Shimizu | 180/79.1 |
| 4,692,645 A | 9/1987 | Gotou | 310/184 |
| 4,721,894 A | 1/1988 | Graber | 318/473 |
| 4,739,201 A | 4/1988 | Brigham et al. | 310/49 R |
| 4,745,984 A | 5/1988 | Shimizu | 180/79.1 |
| 4,771,845 A | 9/1988 | Shimizu | 180/446 |
| 4,780,658 A | 10/1988 | Koyama | 318/808 |
| 4,782,272 A | 11/1988 | Buckley et al. | 318/254 |
| 4,789,040 A | 12/1988 | Morishita et al. | 180/446 |
| 4,805,126 A | 2/1989 | Rodems | 702/106 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,856,607 A | 8/1989 | Sueshige et al. | 180/422 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,988,273 A | 1/1991 | Faig et al. | 425/145 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/79.1 |
| 5,048,630 A * | 9/1991 | Schaffer | 180/422 |
| 5,053,966 A | 10/1991 | Takahashi et al. | 701/41 |
| 5,063,011 A | 11/1991 | Rutz et al. | 264/126 |
| 5,068,591 A | 11/1991 | Hoegberg et al. | 322/29 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,175,479 A | 12/1992 | Tajima et al. | 318/560 |
| 5,223,775 A | 6/1993 | Mongeau | 318/432 |
| 5,238,079 A | 8/1993 | Gorim | 180/142 |
| 5,239,490 A | 8/1993 | Masaki et al. | 364/565 |
| 5,245,286 A | 9/1993 | Carlson et al. | 312/263 |
| 5,272,429 A | 12/1993 | Lipo et al. | 318/808 |
| 5,309,373 A * | 5/1994 | Beebe et al. | 702/41 |
| 5,331,245 A | 7/1994 | Burgbacher et al. | 310/186 |
| 5,339,243 A | 8/1994 | Matsuoka et al. | 701/43 |
| 5,345,156 A | 9/1994 | Moreira | 318/254 |
| 5,349,278 A | 9/1994 | Wedeen | 318/632 |
| 5,349,351 A | 9/1994 | Obara et al. | |
| 5,361,210 A | 11/1994 | Fu | 364/424.05 |
| 5,379,741 A | 1/1995 | Matysiewicz et al. | 123/497 |
| 5,428,285 A | 6/1995 | Koyama et al. | 318/799 |
| 5,433,541 A | 7/1995 | Hieda et al. | 400/279 |
| 5,442,268 A | 8/1995 | Goodarzi et al. | 318/432 |
| 5,444,341 A | 8/1995 | Kneifel, II et al. | 318/432 |
| 5,450,306 A | 9/1995 | Garces et al. | 363/41 |
| 5,460,235 A | 10/1995 | Shimizu | 180/79.1 |
| 5,461,293 A | 10/1995 | Rozman et al. | 318/603 |
| 5,465,210 A | 11/1995 | Walenty et al. | 701/1 |
| 5,467,275 A | 11/1995 | Takamoto et al. | 364/426.01 |
| 5,469,215 A | 11/1995 | Nashiki | 318/432 |
| 5,475,289 A | 12/1995 | McLaughlin et al. | 318/432 |
| 5,493,200 A | 2/1996 | Rozman et al. | 322/10 |
| 5,517,415 A | 5/1996 | Miller et al. | 364/424.05 |
| 5,527,053 A | 6/1996 | Howard | 280/90 |
| 5,528,497 A | 6/1996 | Yamamoto et al. | 701/41 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,616,999 A | 4/1997 | Matsumura et al. | 318/632 |
| 5,623,409 A | 4/1997 | Miller | 364/424.051 |
| 5,625,239 A | 4/1997 | Persson et al. | 310/68 B |
| 5,625,269 A | 4/1997 | Ikeda | 318/696 |
| 5,642,044 A | 6/1997 | Weber | 324/207.25 |
| 5,656,911 A | 8/1997 | Nakayama et al. | 318/718 |
| 5,668,721 A | 9/1997 | Chandy | 701/41 |
| 5,668,722 A | 9/1997 | Kaufmann et al. | 701/41 |
| 5,672,944 A | 9/1997 | Gokhale et al. | 318/254 |
| 5,699,207 A | 12/1997 | Supino et al. | 360/78.09 |
| 5,701,065 A | 12/1997 | Ishizaki | 318/701 |
| 5,712,802 A | 1/1998 | Kumar et al. | 702/132 |
| 5,721,479 A | 2/1998 | Kumar et al. | 318/801 |
| 5,726,588 A | 3/1998 | Fiedler | 322/27 |
| 5,739,650 A | 4/1998 | Kimura et al. | 318/254 |
| 5,744,921 A | 4/1998 | Makaran | 218/254 |
| 5,777,449 A | 7/1998 | Schlager | 318/459 |
| 5,780,986 A | 7/1998 | Shelton et al. | 318/432 |
| 5,801,463 A | 9/1998 | Suzuki et al. | |
| 5,803,197 A | 9/1998 | Hara et al. | 180/248 |
| 5,811,904 A | 9/1998 | Tajima et al. | |
| 5,811,905 A | 9/1998 | Tang | 310/179 |
| 5,811,949 A * | 9/1998 | Garces | 318/448 |
| 5,811,957 A | 9/1998 | Bose et al. | 318/802 |
| 5,828,973 A * | 10/1998 | Takeuchi et al. | 701/41 |
| 5,852,355 A | 12/1998 | Turner | 318/701 |
| 5,872,810 A | 2/1999 | Phillips et al. | 363/95 |
| 5,881,836 A | 3/1999 | Nishimoto et al. | 180/446 |
| 5,898,990 A | 5/1999 | Henry | 29/598 |
| 5,917,721 A | 6/1999 | Kerkman et al. | 363/98 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,934,398 A | 8/1999 | Hotta | 180/65.8 |
| 5,936,322 A | 8/1999 | Yamaguchi et al. | |
| 5,941,338 A | 8/1999 | Miller et al. | 180/421 |
| 5,948,030 A * | 9/1999 | Miller et al. | 701/41 |
| 5,962,999 A | 10/1999 | Nakamura et al. | 318/254 |
| 5,963,706 A | 10/1999 | Baik | 388/804 |
| 5,965,995 A | 10/1999 | Seibel et al. | 318/805 |
| 5,967,253 A | 10/1999 | Collier-Hallman | 180/421 |
| 5,977,740 A | 11/1999 | McCann | 318/701 |
| 5,977,741 A | 11/1999 | DeLange et al. | 318/801 |
| 5,984,042 A | 11/1999 | Nishimoto et al. | 180/446 |
| 5,992,556 A | 11/1999 | Miller | 180/446 |
| 6,002,226 A | 12/1999 | Collier-Hallman et al. | 318/439 |
| 6,002,234 A | 12/1999 | Ohm et al. | 318/729 |
| 6,009,003 A | 12/1999 | Yeo | 363/37 |
| 6,013,994 A * | 1/2000 | Endo et al. | 318/432 |
| 6,034,459 A | 3/2000 | Matsunobu et al. | |
| 6,034,460 A | 3/2000 | Tajima et al. | 310/179 |
| 6,034,493 A | 3/2000 | Boyd et al. | 318/254 |
| 6,039,144 A | 3/2000 | Chandy et al. | 180/446 |
| 6,043,624 A | 3/2000 | Masaki et al. | 318/723 |
| 6,046,560 A | 4/2000 | Lu et al. | 318/432 |
| 6,049,182 A | 4/2000 | Nakatani et al. | 318/432 |
| 6,050,360 A | 4/2000 | Pattok et al. | 180/446 |
| 6,064,172 A | 5/2000 | Kuznetsov | |
| 6,088,661 A | 7/2000 | Poubion | 702/130 |
| 6,092,618 A | 7/2000 | Collier-Hallman | 180/422 |
| 6,104,150 A | 8/2000 | Oohara et al. | 318/254 |
| 6,121,852 A | 9/2000 | Mizoguchi et al. | 333/35 |
| 6,129,172 A | 10/2000 | Yoshida et al. | 180/446 |
| 6,184,638 B1 | 2/2001 | Kinpara | |
| 6,188,189 B1 | 2/2001 | Blake | 318/471 |
| 6,250,419 B1 | 6/2001 | Chabaan et al. | 180/443 |
| 6,250,421 B1 * | 6/2001 | Poshadlo | 180/446 |
| 6,250,520 B1 | 6/2001 | Richard et al. | 222/590 |
| 6,272,947 B1 | 8/2001 | Howard | 74/499 |
| 6,281,650 B1 | 8/2001 | Yutkowitz | |
| 6,281,659 B1 | 8/2001 | Giuseppe | |
| 6,323,614 B1 | 11/2001 | Palazzolo et al. | |
| 6,329,781 B1 | 12/2001 | Matsui et al. | 318/717 |
| 6,334,503 B1 | 1/2002 | Fukumura et al. | 180/446 |

| | | | |
|---|---|---|---|
| 6,338,016 B1 | 1/2002 | Miller et al. | 701/43 |
| 6,344,721 B2 | 2/2002 | Seki et al. | |
| 6,349,789 B1 | 2/2002 | Nakano et al. | 180/446 |
| 6,360,841 B1 | 3/2002 | Blandino et al. | 180/443 |
| 6,373,211 B1 * | 4/2002 | Henry et al. | 318/432 |
| 6,380,658 B1 | 4/2002 | Sebastian et al. | |
| 6,389,338 B1 * | 5/2002 | Chandy et al. | 701/29 |
| 6,392,418 B1 | 5/2002 | Mir et al. | |
| 6,408,234 B1 | 6/2002 | Wittig | |
| 6,411,052 B1 | 6/2002 | Mir et al. | 318/434 |
| 6,426,602 B1 | 7/2002 | McCann et al. | 318/432 |
| 6,429,565 B1 | 8/2002 | Matsunobu et al. | |
| 6,429,620 B2 | 8/2002 | Nakazawa et al. | 318/701 |
| 6,448,731 B1 | 9/2002 | Miller et al. | 318/488 |
| 6,470,225 B1 | 10/2002 | Yutkowitz | |
| 6,489,761 B1 | 12/2002 | Schroeder et al. | |
| 6,498,409 B1 | 12/2002 | Collier-Hallman et al. | |
| 6,498,541 B2 | 12/2002 | Den Besten et al. | 318/661 |
| 6,501,243 B1 | 12/2002 | Kanedo et al. | 318/700 |
| 6,510,396 B1 | 1/2003 | Colosky | |
| 6,516,680 B1 | 2/2003 | Nakamura et al. | 74/388 PS |
| 6,520,279 B2 | 2/2003 | Fukumoto et al. | 180/446 |
| 6,538,429 B2 | 3/2003 | Schroeder et al. | |
| 6,549,871 B1 | 4/2003 | Mir et al. | |
| 6,555,985 B1 | 4/2003 | Kawabata et al. | 318/685 |
| 6,564,125 B2 * | 5/2003 | Pattok et al. | 701/29 |
| 6,580,627 B2 | 6/2003 | Toshio | 363/98 |
| 6,614,223 B2 | 9/2003 | Schroeder et al. | |
| 6,637,544 B2 | 10/2003 | Stevens et al. | |
| 6,647,329 B2 | 11/2003 | Kleinau et al. | |
| 6,694,287 B2 | 2/2004 | Mir et al. | |
| 6,713,921 B2 | 3/2004 | Sebastian et al. | |
| 6,713,922 B2 | 3/2004 | Piech et al. | |
| 6,720,751 B2 | 4/2004 | Plasz et al. | |
| 6,720,763 B1 | 4/2004 | Nehl et al. | |
| 6,721,629 B2 | 4/2004 | Wendling et al. | |
| 6,759,780 B2 | 7/2004 | Liu et al. | |
| 6,788,013 B2 | 9/2004 | Islam et al. | |
| 6,863,150 B1 | 3/2005 | Tanaka et al. | |
| 6,900,607 B2 | 5/2005 | Kleinau et al. | 318/432 |
| 6,906,443 B2 | 6/2005 | Luo et al. | |
| 6,914,399 B2 | 7/2005 | Kushion et al. | 318/434 |
| 6,940,198 B2 | 9/2005 | Ionel et al. | |
| 6,965,820 B2 * | 11/2005 | Amberkar et al. | 701/41 |
| 6,968,920 B2 * | 11/2005 | Barton et al. | 180/446 |
| 7,233,850 B2 * | 6/2007 | Nakano et al. | 701/41 |
| 7,389,851 B2 * | 6/2008 | Miyaura | 180/446 |
| 2001/0047233 A1 | 11/2001 | Kleinau et al. | |
| 2002/0022912 A1 * | 2/2002 | Urabe et al. | 701/41 |
| 2003/0033064 A1 | 2/2003 | Amberkar et al. | |
| 2003/0040855 A1 * | 2/2003 | Pattok et al. | 701/29 |
| 2003/0055543 A1 * | 3/2003 | Amberkar et al. | 701/41 |
| 2003/0055546 A1 | 3/2003 | Demerly et al. | |
| 2003/0062868 A1 | 4/2003 | Mir et al. | 318/599 |
| 2003/0071594 A1 | 4/2003 | Kleinau et al. | 318/567 |
| 2003/0076061 A1 | 4/2003 | Kleinau et al. | 318/432 |
| 2003/0076064 A1 | 4/2003 | Kleinau et al. | 318/567 |
| 2003/0076065 A1 | 4/2003 | Shafer et al. | 318/567 |
| 2003/0146731 A1 | 8/2003 | Berggren et al. | 318/708 |
| 2003/0230947 A1 | 12/2003 | Islam et al. | 310/156.47 |
| 2004/0112146 A1 | 6/2004 | Islam et al. | 73/862.331 |
| 2005/0182542 A1 * | 8/2005 | Kwasny et al. | 701/41 |
| 2006/0015227 A1 | 1/2006 | Knoll | |
| 2006/0041355 A1 * | 2/2006 | Blundell et al. | 701/41 |

FOREIGN PATENT DOCUMENTS

| | | |
|---|---|---|
| EP | 08 221 30 A1 | 2/1998 |
| EP | 0872406 A2 | 10/1998 |
| EP | 0 943 481 A2 | 9/1999 |
| EP | 0966093 A2 | 12/1999 |
| EP | 1031492 | 2/2000 |
| EP | 1170196 A2 | 1/2002 |
| EP | 1283148 A2 | 2/2003 |
| EP | 1559633 | 1/2005 |
| FR | 2843085 | 2/2002 |
| GB | 19824914 | 6/1998 |
| JP | 09051700 | 2/1997 |
| JP | 9-271198 | 10/1997 |
| JP | 11262241 | 9/1999 |
| WO | WO 0120751 | 3/2001 |

OTHER PUBLICATIONS

Berendsen, Carsten-Sunnke; Champenois, Gerard; and Bolopion Alain; "Commutation Strategies for Brushless DC Motors: Influence on Instant Torque", Apr. 1993, *IEEE Transactions on Power Electronics*, vol. 8 No. 2; pp. 231-236.

Blaabjer, Frede; Pedersen, John K.; Jaeger, Ulrik; and Paul Thoegersen; "Single Current Sensor Technique in the DC Link of Three-Phase PWM-VS Inverters: A Review and a Novel Solution", Sep./Oct. 1997, *IEEE Transactions on Industry Applications*, vol. 33 No. 5; pp. 1241-1249.

De La Ree, Jaime; and Latorre, Jaime; "Permanent Magnet Machines Torque Considerations," *Conference Record of the IEEE Industry Applications Society Annual Meeting Part I*, IEEE Catalog No. 88CH2565-0, Part 1, Oct. 2-7, 1988; pp. 32-37.

De La Ree, Jaime; and Boules, Nady; "Torque Production in Permanent-Magnet Synchronous Motors", Jan./Feb. 1989, *IEEE Transactions on Industry Applications*, vol. 25 No. 1; pp. 107-112.

Mirkazemi-moud, Mehran; Green, Tim C.; and Williams, Barry W.; "Analysis and Comparison of Real-Time Sine-Wave Generation for PMW Circuits", Jan. 1993, *IEEE Transactions on Power Electronics*, vol. 8, No. 1; pp. 46-54.

Murai, Yoshihiro; Kawase, Yoshihiro; and Ohashi, Karuharu; "Torque Ripple Improvement for Brushless DC Miniature Motors," *Conference Record of the 1987 IEEE Industry Applications Society Annual Meeting Part 1*, IEEE Catalog No. 87CH2499-2, Oct. 18-23, 1987; pp. 21-28.

Parasiliti, Francesco; Petrella, Roberto; and Tursini, Marco; "Low Cost Phase Current Sensing in DSP Based AC Drives," *IEEE Transactions*, pp. 1284-1289.

*Brown Boveri Review*, "Static Frequency Changers with "Subharmonic" Control in Conjunction with Reversible Variable-Speed A.C. Drives," Aug./Sep. 1964, vol. 51 No. 8/9; pp. 555-577.

Asaii, B., et al.; "A Simple High Efficient Torque Control for the Electric Vehicle Induction Machine Drives Without a Shaft Encoder"; Power Electronics Specialists Conference, 1995. PESC '95 Records, 26$^{th}$ Annual IEEE Atlanta, GA, USA Jun. 18-22, 1995, pp. 778-784.

Gotter Gottfried; "Erwarmung and Kü hlung elektrischer Maschinin"; Springer Verlag, Berlin 1954; pp. 95-116.

Zoran Lazarevic, et al.; "A Novel Approach for Temperature Estimation in Squirrel-Cage Induction Motor Without Sensors", IEEE Transactions on Instrumentation and Measurement, IEEE Inc. New York, US, vol. 48, No. 3, Jun. 1999, pp. 753-757.

Gotter Gottfried, Erwarmung und Huhlung elektrischer Maschinin, Springer, Berlin XP002223108, pp. 95-110.

Industry Applications Conference, 1995. Thirtieth IAS Annual Meeting, IAS '95., Conference Record of the 1995 IEEE Orlando, Florida Oct. 8-12, 1995, New York, NY, USA, IEEE, US, pp. 207-215.

"A Novel Approach for Temperature Estimation in Squirrel-Cage Induction Motor Without Sensors", IEEE Transactions on Instrumentation and Measurement, IEEE Inc., New York, US, vol. 48, No. 3, Jun. 1999, pp. 759-757.

U.S. Appl. No. 11/494,088, filed Jul. 27, 2006.
U.S. Appl. No. 11/495,199, filed Jul. 28, 2006.
U.S. Appl. No. 11/495,219, filed Jul. 28, 2006.
EP Search Report issued Aug. 6, 2008, EP Application No. 07121593.3-1523.
EP Search Report issued Jul. 15, 2008, EP Application No. 07075579.8-1264.
EP Search Report issued Nov. 2, 2007, EP Application No. 07075577.2-1523.
EP Search Report dated May 8, 2009, EP Application No. 09003760.7-1523.

* cited by examiner

METHOD, SYSTEM, AND APPARATUS FOR PROVIDING ENHANCED STEERING PULL COMPENSATION

BACKGROUND

In a vehicle equipped with an electric power steering ("EPS") system, steering assist torque is provided by an electric motor coupled to a steering column or shaft. A steering wheel or handwheel is also typically coupled to the steering column or shaft in order for a driver to steer the vehicle. When the driver wants to travel substantially straight ahead along a linear path, the handwheel is rotated to a generally centered neutral position which does not cause a change in the direction of travel. However, due to mechanical tolerances and other factors, the handwheel may need to be rotated somewhat away from center to maintain the vehicle's heading along a substantially linear, straight-ahead path.

Under such off-center conditions, the driver may or may not need to provide any input torque in order to keep the hand-wheel at a neutral position which provides a straight direction of travel, depending on whether there is any torque coming from the steering system that tends to rotate the hand-wheel clockwise or counterclockwise. In situations where the hand-wheel must be pulled slightly in one direction to maintain a substantially straight course, the driver must exert some force to prevent the vehicle from deviating from the intended path. This phenomenon, commonly known as "steering pull", can be caused by many factors such as, for example, camber or caster misalignment at the front end, tire properties of ply steer or conicity, air pressure differentials between left and right tires, road surfaces that are not level, crowned pavement, and prevailing wind.

U.S. Publication No. US2005/0182542 describes an electric power steering pull compensation procedure which measures the difference in handwheel angle between the current handwheel angle and what was determined to be a straight-ahead handwheel position using measurements of the handwheel angle acquired over time. The measured difference is provided to an integrator to update a learned long-term correction value towards the currently measured handwheel angle. The long-term correction value is stored in an electronic memory device. A second integrator computes a short-term correction value based on the difference between the current handwheel angle and the stored long-term correction value. The short-term correction value may be reset to an initial value in response to driving conditions such as the steering angle, the speed at which the steering angle changes, and the speed of the vehicle. For example, the speed at which the steering angle changes will increase as the vehicle is driven around a curve. The acquisition of short-term and long-term correction values may be enabled, as well as disabled, in response to one or more of the aforementioned driving conditions. The long-term and short-term correction values are turned into torque commands for an electric motor. As a practical matter, the actual handwheel angle may not be reduced to zero in the presence of steering pull. Since a non-zero angle is required to maintain a straight-ahead course heading, this procedure essentially provides open-loop pull compensation based upon measured angle differences.

The steering pull compensation procedure disclosed in US2005/0182542 presents many inherent limitations and shortcomings. Not infrequently, a straight-ahead course heading may be achieved at a non-zero handwheel angle, but with zero torque being applied to the handwheel. For example, even though wheel caster and camber are properly aligned, with all tires properly inflated, the handwheel might not be accurately centered on its shaft. Under these conditions, the procedure of US2005/0182542 measures an angle error and attempts to compensate for the error by applying torque commands to the electric motor. This applied compensation is incorrect, causing the driver to feel a pull at the handwheel.

Another type of driving behavior that occurs from time to time is a driver momentarily taking their hands off the handwheel, resulting in a zero torque condition at the handwheel where, nonetheless, the car may drift outside its lane. The procedure of US2005/0182542 will acquire potentially misleading data during this zero-torque condition and apply this data to the long-term correction value, resulting in incorrect torque commands being applied to the motor. Erroneous or misleading data may also be acquired while a temporary or transient condition exists, such as a change in vehicle loading, localized irregularities in a road surface, wind gusts, or the like. Accordingly, what is needed is an improved technique which accurately and reliably compensates for steering pull across a wide range of real-world conditions.

SUMMARY

The above described and other features are exemplified by the following Figures and Description in which a method is provided to compensation for steering pull in a vehicle steering system that includes a handwheel. The method includes monitoring the vehicle to determine whether the vehicle is heading forward along a substantially linear straight-ahead path and, if so, measuring handwheel torque, as a sensed torque signal, to determine an amount of steering pull existing at the handwheel. The method also includes generating a torque assist signal in response to the sensed torque signal and calculating an offset signal for reducing the amount of steering pull to substantially zero. The method further includes producing a modified torque assist signal by adding the offset signal to the torque assist signal, and applying the modified torque assist signal to the vehicle steering system.

Pursuant to another embodiment, a controller is provided for a vehicular steering system that includes a handwheel for steering the vehicle, a torque sensing mechanism for sensing torque applied to the handwheel and providing a sensed torque signal in response thereto, an angular position sensor for sensing an angular position of the handwheel and providing an angular position sensor output in response thereto, a vehicle speed sensor capable of acquiring vehicle speed, and a motor which provides assist torque to the steering system. The controller includes a torque assist function responsive to the sensed torque signal for providing a torque assist command to the motor, and a steering pull compensator for modifying the torque assist command to the motor by an offset signal corresponding to a detected steering pull condition. The steering pull compensator includes a first lowpass filter operatively coupled to a first integrator for generating a short term compensation signal from the sensed torque signal, a second lowpass filter operatively coupled to the second integrator for generating a long term compensation signal from a modification of the sensed torque signal, and a combiner for combining the short term compensation signal and the long term compensation signal to generate the offset signal. The first lowpass filter has a first time constant, and the second lowpass filter has a second time constant longer than the first time constant. The first integrator has a first gain, and the second integrator has a second gain less than the first gain. The first and second lowpass filters are enabled in response to the vehicle traveling forward along a substantially linear straight-ahead path as determined by at least one of the sensed torque signal, the angular position sensor output, and the acquired vehicle speed.

Pursuant to another embodiment, a system for providing compensation for steering pull in a vehicle steering system is provided. The system includes a pull compensation signal generator, a power steering assist motor, and a processing mechanism. The processing mechanism controls the power steering assist motor through fault and limit logic as a function of the pull compensation signal generator.

BRIEF DESCRIPTION OF THE DRAWINGS

Referring now to the Figures wherein like elements are numbered alike.

DESCRIPTION OF PREFERRED EMBODIMENTS

Figure 1:
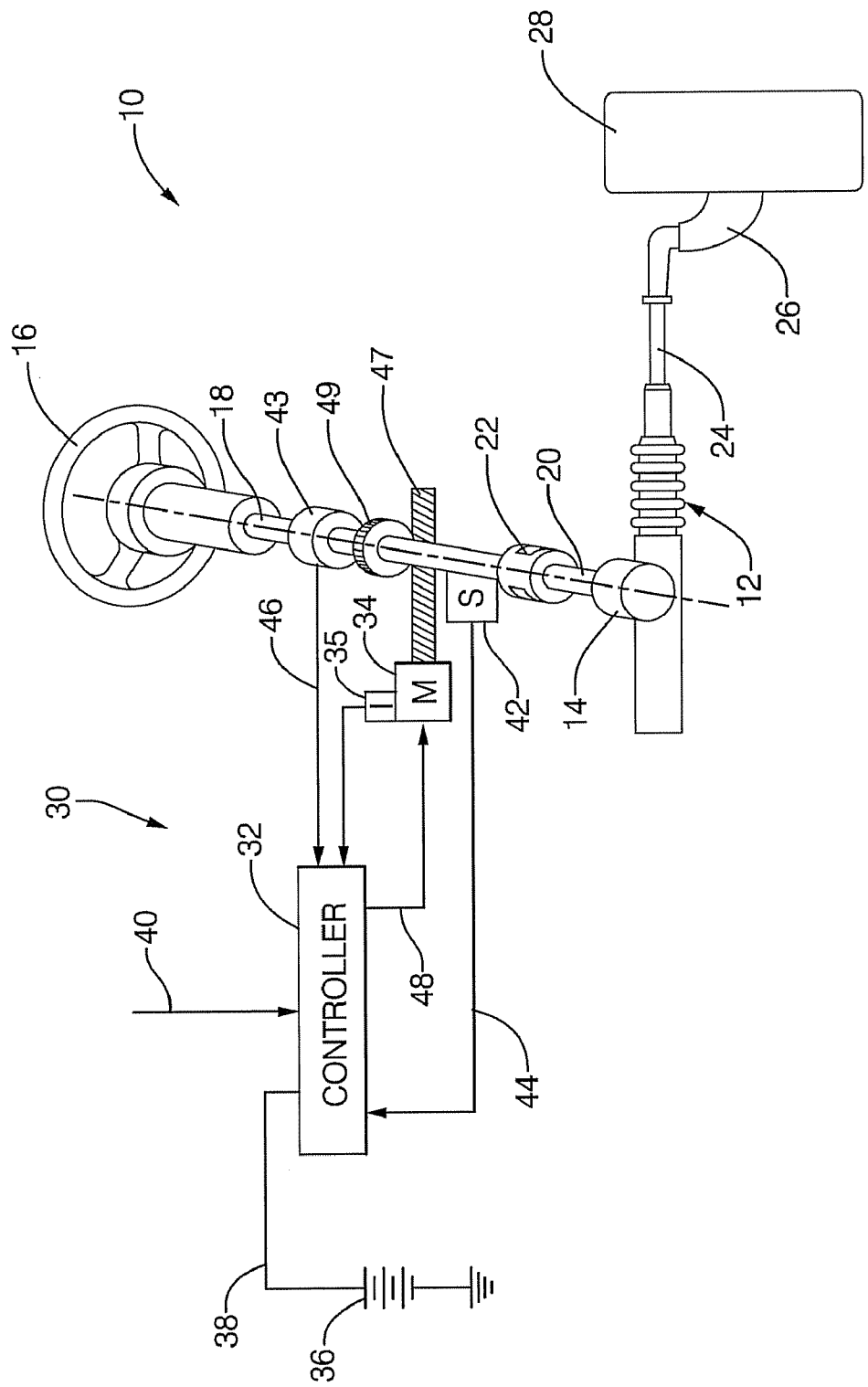
FIG. 1 is a block diagram showing an illustrative operational environment for the exemplary embodiments disclosed herein.

Referring to FIG. 1, reference numeral 10 generally designates an electric power steering ("EPS") system for a motor vehicle. A steering mechanism 12 is a rack-and-pinion type mechanism that includes a toothed rack (not shown) and a pinion gear (also not shown) located under a gear housing 14. A handwheel 16 is coupled to an upper steering shaft 18. As handwheel 16 is turned, upper steering shaft 18, which is connected to a lower steering shaft 20 through a universal joint 22, turns the pinion gear. Rotation of the pinion gear moves the toothed rack, which moves tie-rods 24 (only one shown) that, in turn, move steering knuckles 26 (only one shown), which turn wheels 28 (only one shown).

EPS assist torque is provided through an assist unit generally designated by reference numeral 30, which includes a controller 32 and an electric motor 34. A motor position commutation sensor 35 measures the position of the electric motor 34. The controller 32 is powered by a vehicular power supply 36 through a supply line 38. The controller 32 receives a signal indicative of vehicle speed (i.e., vehicle velocity) on signal line 40, which signal may be integrated in order to provide a signal indicative of distance traveled. In exemplary embodiments, the signal line 40 may include other signals indicative of vehicle motion such as a yaw rate, a lateral acceleration, or other vehicle motion signals known in the pertinent art. Alternatively, the signals indicative of vehicle motion may be individual inputs to the controller 32. The angular position of handwheel 16 is measured by a handwheel angular position sensor 42 and fed to controller 32 through line 44. The handwheel angular position sensor 42 may be an optical-encoding type of sensor, a variable resistance type of sensor, or any other suitable type of position sensor for performing the functions of an angular position sensor. Angular position refers to the rotational position of handwheel 16 indicative of a direction in which the vehicle is steered. Although the angular position of the handwheel 16 as measured by the handwheel angular position sensor 42 is referred to herein, it will be understood that any equivalent signal combination may be used to determine a vehicle column/pinion shaft position within the scope of the disclosed invention. For example, a motor position sensor, a column position sensor, or a rack position sensor may be substituted for the handwheel angular position sensor 42 in exemplary embodiments further detailed herein.

As handwheel 16 is turned, bandwheel torque sensing mechanism 43 senses a torque (i.e., twisting force) applied to handwheel 16 by a vehicle operator. Handwheel torque sensing mechanism 43 may include a torsion bar (not shown) and a variable-resistance type of sensor (also not shown) that outputs a signal to controller 32 through line 46 in relation to an amount of twist present on the torsion bar. Other suitable torque sensing devices used with known signal processing techniques will suffice in alternate embodiments.

In response to inputs on any of lines 40, 44 and 46, controller 32 sends a command signal through line 48 to electric motor 34. In response to this command signal, electric motor 34 supplies torque assist to the steering system through a worm 47 and a worm gear 49, so as to provide a steering torque assist to the vehicular steering system in addition to any steering force exerted by the vehicle operator.

Figure 2:
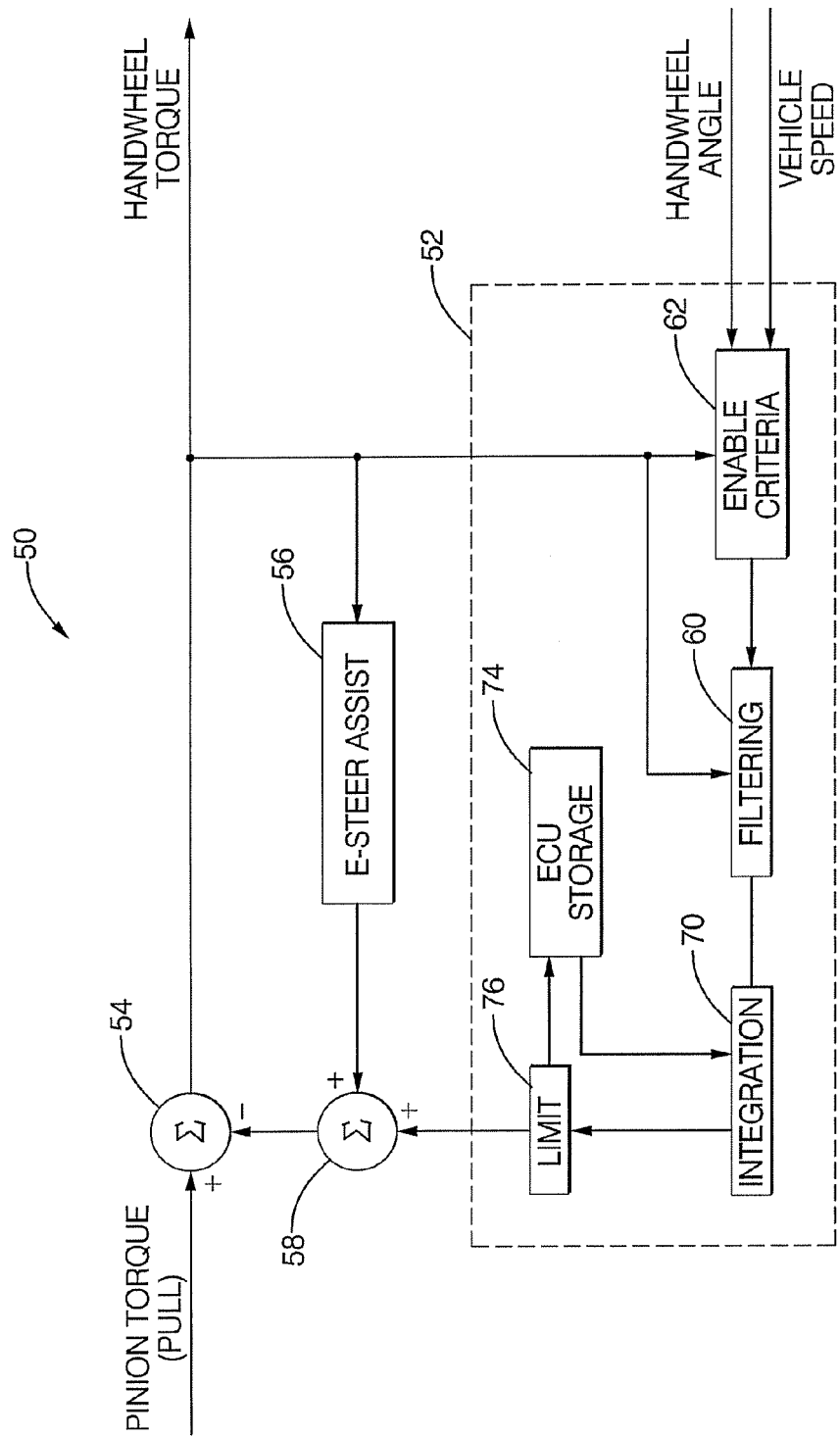
FIG. 2 is a block diagram showing an illustrative controller for use with the configuration of FIG. 1 in exemplary embodiments.

As shown in FIG. 2, an EPS control algorithm is indicated generally by the reference numeral 50, which algorithm is implemented by the controller 32 of FIG. 1. The EPS control algorithm 50 includes a steering pull compensator 52. The EPS control algorithm 50 receives a signal indicative of the torque applied to the pinion gear at a non-inverting input of a summing function 54, which generates an applied torque signal indicative of the torque applied to handwheel 16 (FIG. 1) by a vehicle operator. A torque assist function 56 depicted as "electronic power steering" as known to those of ordinary skill in the pertinent art, receives the applied torque signal and produces a signal indicative of the desired assist torque. A summing function 58 receives the assist torque signal at a non-inverting input, and generates a signal to be subtracted from the pinion torque at an inverting input of summing function 54.

The steering pull compensator 52 receives the applied torque signal at a filter 60, which also receives a condition flag from an enable criteria block 62. The filter 60 provides a filtered version of the applied torque signal to an integrator 70.

The output from the integrator 70 is limited by a limit function 76. The limited value may be stored in an electronic control unit (ECU) storage 74. The stored value may be used to initialize the integrator 70 at the next ignition cycle. The ECU storage 74 may also hold other configuration parameters and filter coefficients. The output from limit function 76 is received at a non-inverting input of summing function 58.

In operation, in the presence of pull, the handwheel torque felt by the driver is determined by torque assist function 56 and summing function 54, where the assist torque is provided as a function of the torque applied at handwheel 16 (FIG. 1). The driver torque due to the pull compensation scheme is affected by steering pull compensator 52 (FIG. 2) in combination with summing function 58. A combination of vehicle signals received at enable criteria block 62 are used to determine if the vehicle is being driven forward along a substantially linear, straight-ahead path. This information is used to conditionally filter the torque applied by the driver at filter 60. If the enable criteria block 62 produces a TRUE output indicating that the vehicle is being driven along a substantially linear, straight-ahead path, then the torque is filtered. If the enable criteria block 62 produces a FALSE output, then the filter value is held to the last value.

The output from the filter 60 is presented to the integrator 70 which functions to integrate, with a calibrated gain, the filtered value toward zero. As will be recognized by those of ordinary skill in the pertinent art based on the teachings herein, the integrator 70 could instead be a constant increment or quantizer, a proportional increment, or any other form of increment suitable to meet design criteria. In addition, a calibrated value may be used such that no increment and no compensation are applied if the measured torque is below a certain threshold. If the enable criteria block 62 produces a FALSE output, the input to integrator 70 is set to zero. So while no new learning will take place, the previously learned compensation is still applied. The limit function 76 uses a calibrated value to prevent the pull compensation from exceeding a desired or predetermined value. The algorithm continues to reduce the pull torque in handwheel 16 (FIG. 1) until the value of the torque reaches zero or a calibrated threshold.

As will be recognized by those of ordinary skill in the pertinent art based on the teachings herein, the calculated pull compensation may be implemented in several alternate ways, such as, for example, by continuous compensation performed in real time, by compensation added at beginning of each of a plurality of ignition cycles based on values computed in one or more preceding cycles, by compensation added at the beginning of an ignition cycle after a pull condition has been detected over multiple ignition cycles with additions to be made to the shown configuration to account for storage and selection of multiple values, or by compensation having a compensation value that can be accessed during vehicle service provided by writing an offset to a memory location. Each ignition cycle comprises activating an ignition mechanism to start the vehicle, driving the vehicle, and then switching the vehicle off.

Steering pull compensator 52 accepts applied steering handwheel torque as one of its inputs and produces a compensating torque command to be added to the regular steering assist command. Thus, when a steering pull torque is present, the controller 32 will eventually reduce it to a level that the driver may not perceive. The compensating process starts by determining the existence of a residual torque at the steering handwheel 16 caused by pull. When the controller 32 determines that the steering handwheel torque is most likely an undesirable residual torque while the driver intends to drive in a forward direction along a substantially linear straight-ahead path, the EPS control algorithm 50 adds torque as calculated by the steering pull compensator 52 to the torque assist function 56 so that the driver no longer has to provide the torque. Thus in exemplary embodiments, a driver may take her hands off the handwheel 16, with the vehicle continuing to travel along the substantially linear straight-ahead path without further driver intervention. The compensating torque value calculated by the steering pull compensator 52 may be stored to a memory location in the ECU storage 74 which can be reset at vehicle assembly or upon mechanical service being performed to correct the steering pull condition.

Figure 3:
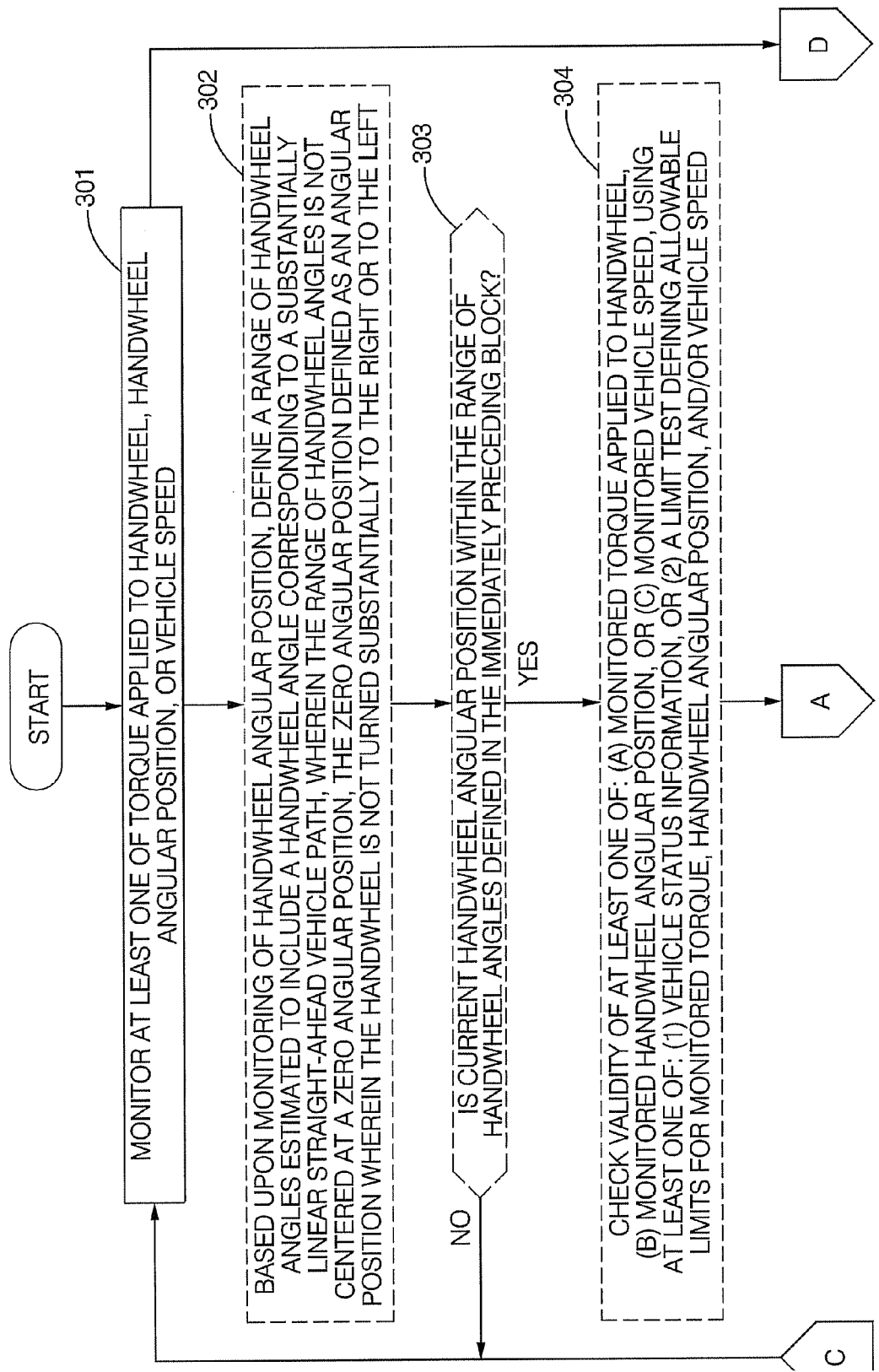
FIGS. 3A, 3B, and 3C together comprise a flowchart setting forth a method of providing steering pull compensation according to a first set of exemplary embodiments disclosed herein.
Figure 3:
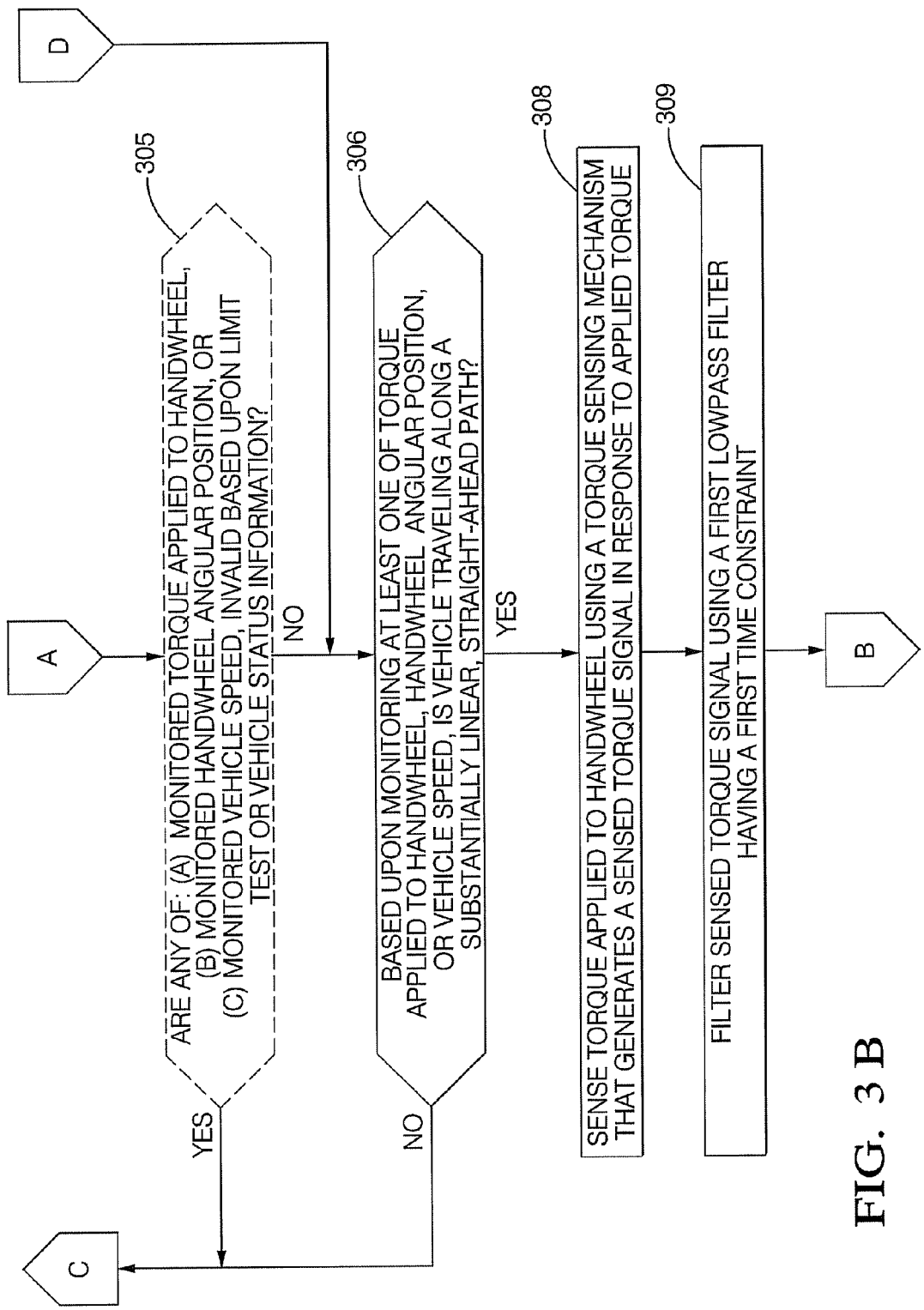
Figure 3:
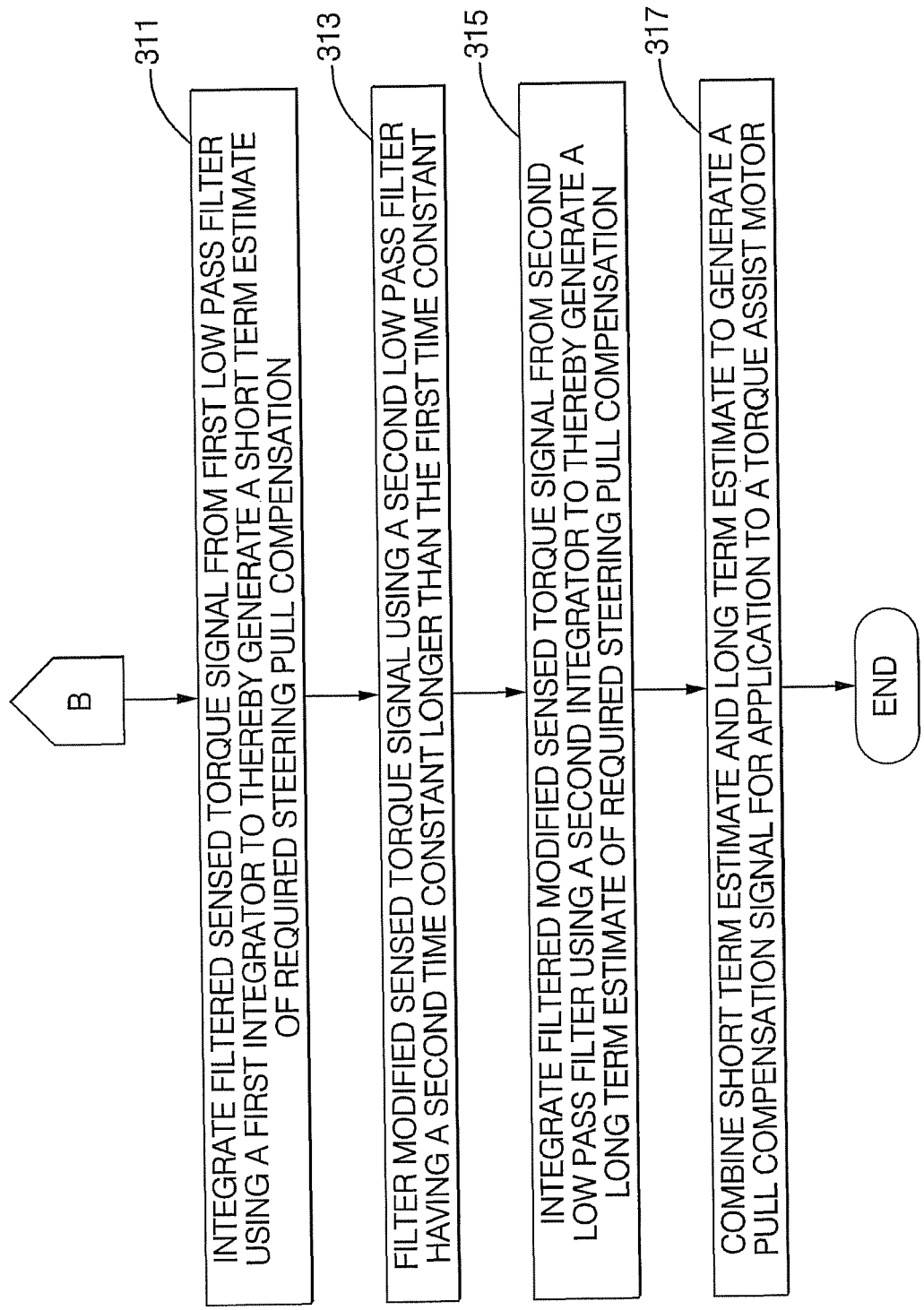

FIGS. 3A-3C together comprise a flowchart setting forth a method of providing steering pull compensation according to a first set of embodiments disclosed herein. The method commences at block 301 where at least one of torque applied to handwheel 16 (FIG. 1), handwheel angular position, or vehicle speed are monitored. Additionally or alternatively, throughout FIGS. 3A-3C, it is possible to monitor any of handwheel velocity, vehicle acceleration, yaw rate, lateral acceleration, wheel speeds, or delta wheel speeds, which may assist in determining whether a vehicle is heading forward on substantially linear straight-ahead path. Optionally (FIG. 3A, block 302), based upon monitoring of handwheel angular position, a range of handwheel angles is defined. This range is estimated to include a handwheel angle corresponding to a substantially linear straight-ahead vehicle path. In the presence of steering pull, the range of handwheel angles is not centered at a zero angular position. This zero angular position is defined as an angular position wherein the handwheel is not turned substantially to the left or to the right. Next, at optional block 303, a test is performed to ascertain whether or not the current handwheel angular position is within the range of handwheel angles defined in the immediately preceding block. If not, the program loops back to block 301.

Optional blocks 302 and 303 are intended to address situations where it may be desirable to limit the range of handwheel angle measurements that will be considered driving along a substantially linear, straight-ahead path. Nonetheless, a sufficiently broad range should be utilized so as to enable detection of steering pull conditions which, by definition, are not centered at zero. Accordingly, a conditional filter may be applied to handwheel angular position such that, during conditions of low handwheel torque and high vehicle speed, the handwheel angular position data are monitored and slowly filtered. The filtered result would then be a good choice for where to center the allowable handwheel range to enable steering pull compensation. For example, a given vehicle may require 15 degrees of handwheel angle to the left of a straight-ahead angular position in order to hold a 2 Nm pull condition to guide the vehicle along a substantially linear, straight-ahead path. With a handwheel angular position enable criteria range centered at zero, a range of 20 degrees might then be required in order to reliably detect the pull condition and compensate for it. Yet a 20-degree range is a rather large range which might compromise performance under a variety of conditions. On the other hand, if the algorithm of FIGS. 3A-3C is allowed to adjust for this 15-degree offset, a range of only plus and minus 5 degrees might then be needed to adequately detect and compensate for the aforementioned 2 Nm of steering pull.

The affirmative branch from optional block 303 leads to optional block 304 where a validity check is performed. The validity of at least one of (a) monitored torque applied to the handwheel, (b) monitored handwheel angular position, or (c) monitored vehicle speed, is tested. The test is performed using at least one of (1) vehicle status information, or (2) a limit test defining allowable limits for monitored torque, handwheel angular position, and/or vehicle speed. Accordingly, a test is performed at optional block 305 to determine whether or not any of (a) monitored torque applied to the handwheel, (b) monitored handwheel angular position, or (c) monitored vehicle speed, are invalid based upon a limit test or vehicle status information. For example, if a vehicle speed fault is present, this may result in monitored vehicle speed being set to a fixed default value instead of an actual or measured value. In this situation, the pull compensation algorithm of FIGS. 3A-3C should not be enabled because it might otherwise learn corrections during driving maneuvers which were not essentially straight-ahead driving. Similar considerations apply to handwheel angular position and applied handwheel torque. Pursuant to an alternate embodiment, if other vehicle sensor signals are valid, an invalid handwheel angle or vehicle speed is tolerated. For instance, if the torque applied to the handwheel as monitored by a handwheel torque sensing mechanism is valid, then subsequent operations as set forth in the pull compensation algorithm of FIGS. 3A-3C may be enabled by following the negative branch from block 305 (indicating failure to find an invalid value). The affirmative branch from block 305 (indicating success at finding at least one invalid value), leads back to block 301.

The negative branch from optional block 305 leads to block 306. Alternatively, block 306 is performed immediately after block 301 if optional blocks 302-305 are not to be performed. At block 306, a test is performed to ascertain whether or not the vehicle is traveling along a substantially linear, straight-ahead path based upon monitoring at least one of torque applied to the handwheel, handwheel angular position, or vehicle speed. If not, the program loops back to block 301.

The affirmative branch from block 306 leads to block 308 where a torque sensing mechanism senses torque applied to the handwheel by generating a sensed torque signal in response to applied torque. The sensed torque signal is then filtered (block 309) using a lowpass filter having a first time constant. Next, the filtered sensed torque signal from the first lowpass filter is integrated using a first integrator, to thereby generate a short term estimate of required steering pull compensation (block 311).

A modified sensed torque signal is filtered using a second lowpass filter having a time constant longer than the first time constant (block 313). The filtered modified sensed torque signal from the second lowpass filter is integrated using a second integrator to thereby generate a long term estimate of required steering pull compensation (block 315). At block 317, the short term estimate and the long term estimate are combined to generate a pull compensation signal for application to a torque assist motor such as electric motor 34 (FIG. 1).

Figure 4:
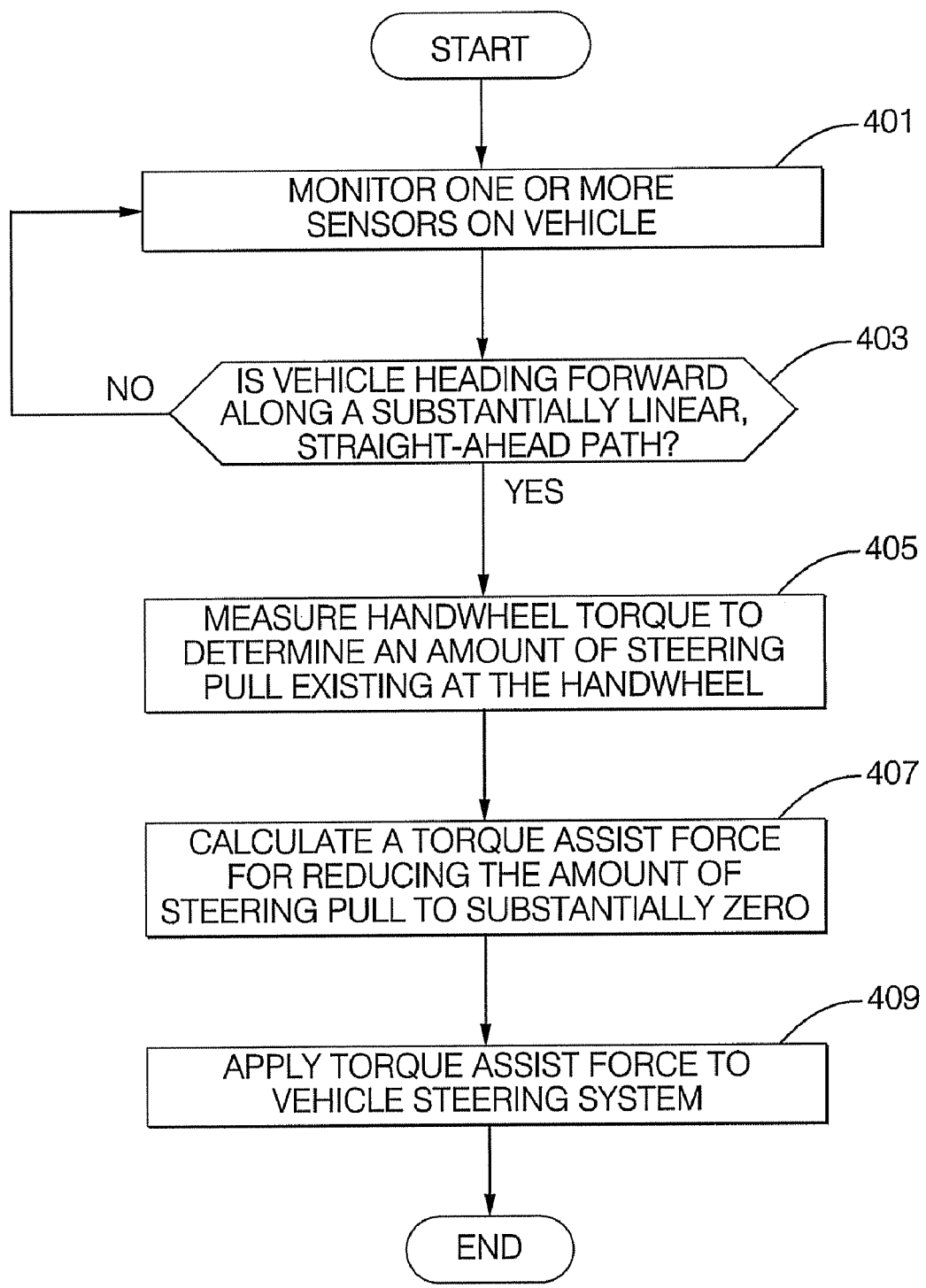
FIG. 4 is a flowchart setting forth a method of providing steering pull compensation according to a second set of exemplary embodiments disclosed herein.

FIG. 4 is a flowchart setting forth a method of providing steering pull compensation according to a second set of embodiments disclosed herein. The method provides compensation for steering pull in a vehicle steering system that includes a handwheel. With reference to block 401, the method includes monitoring one or more sensors on the vehicle. At block 403, a test is performed to determine whether or not the vehicle is heading forward along a substantially linear straight-ahead path based upon the sensor monitoring of block 401. If not, the program loops back to block 401.

The affirmative branch from block 403 leads to block 405 where handwheel torque is measured to determine an amount of steering pull existing at the handwheel. A torque assist force is calculated for reducing the amount of steering pull to substantially zero (block 407). This torque assist force is applied to the vehicle steering system (block 409).

Figure 5:
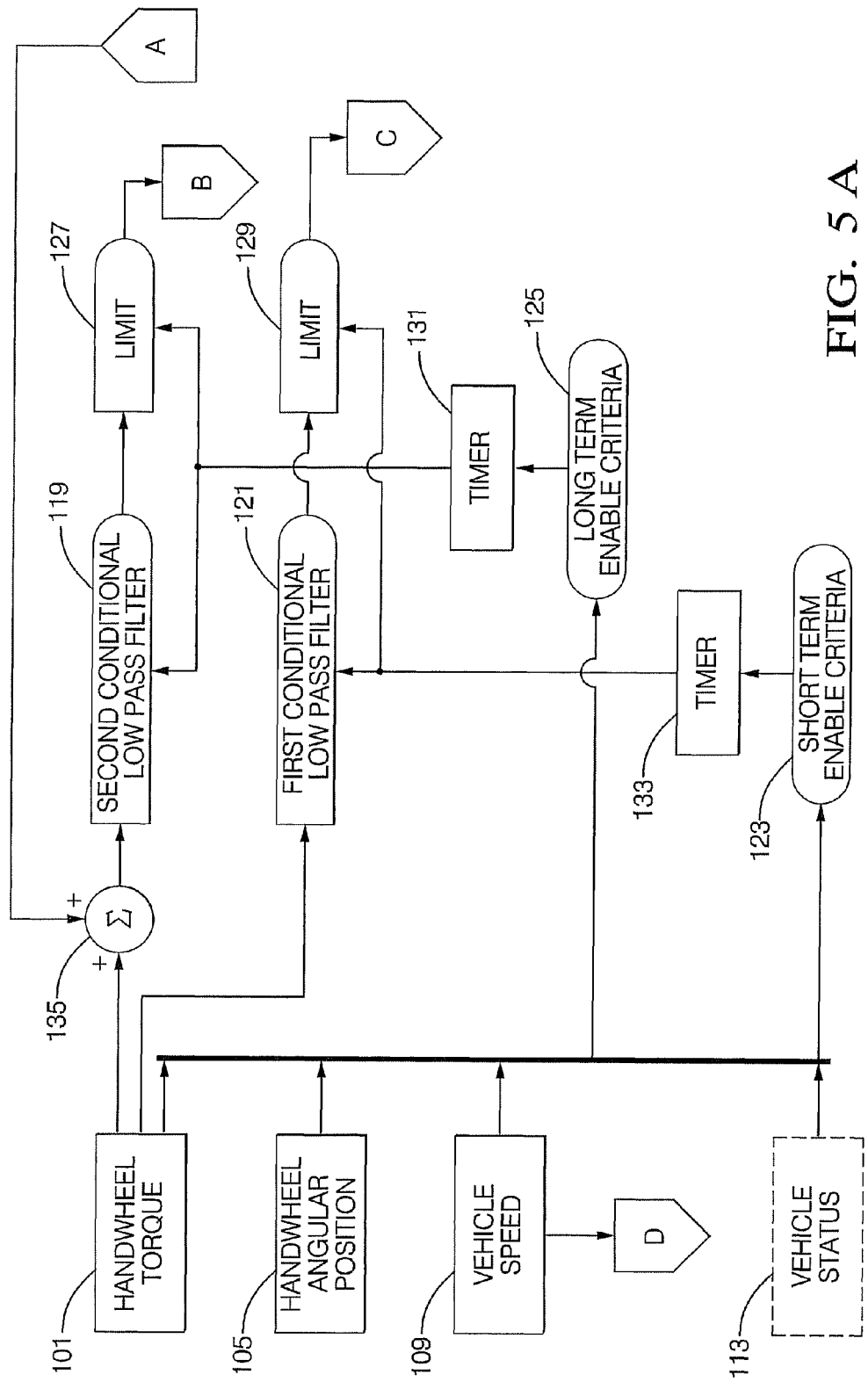
FIGS. 5A and 5B together comprise a block diagram of a system for providing steering pull compensation according to a third set of exemplary embodiments disclosed herein.
Figure 5:
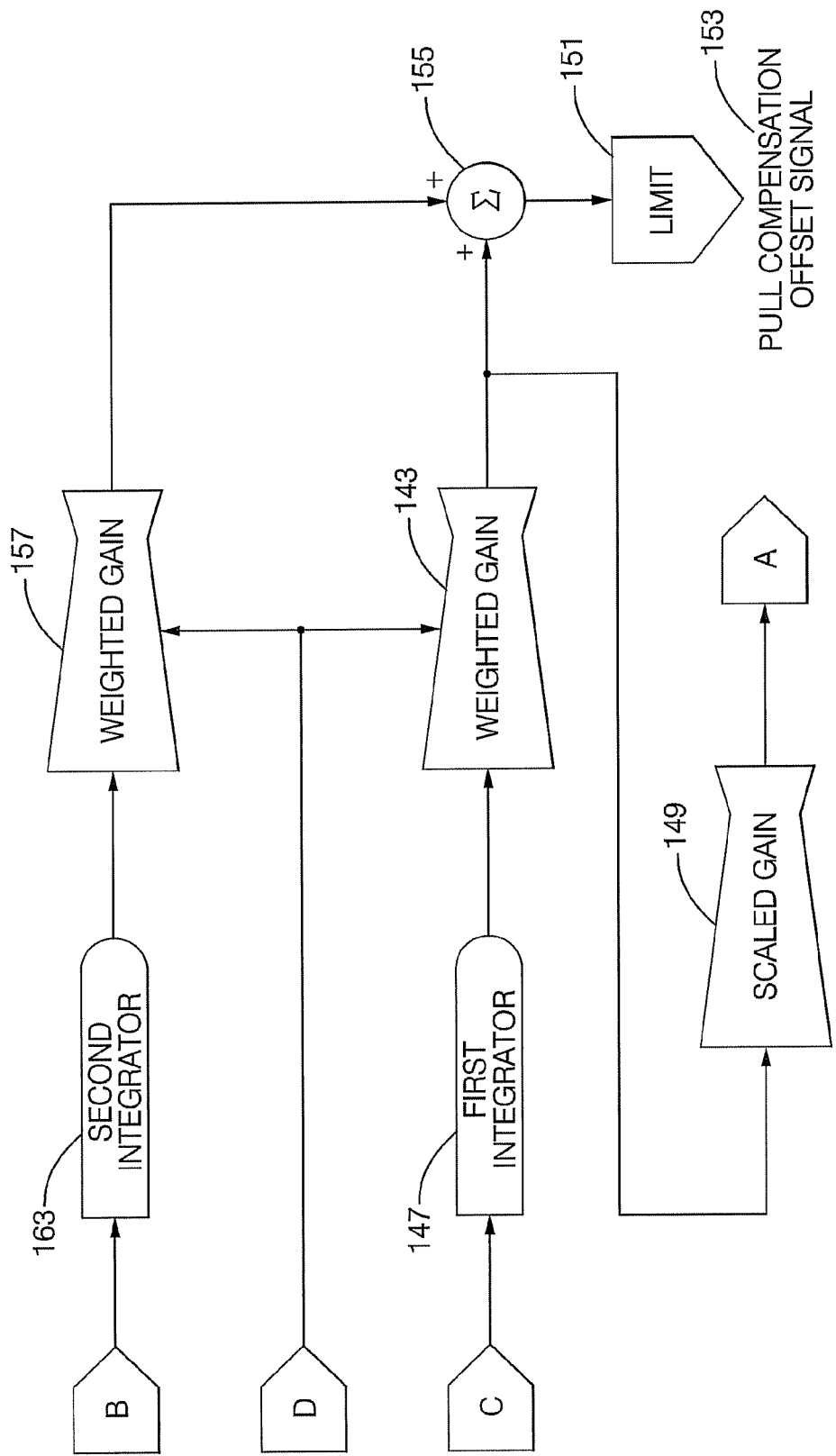

FIGS. 5A and 5B together comprise a block diagram of a system for providing steering pull compensation according to a third set of embodiments disclosed herein. The system includes one or more vehicle inputs such as a handwheel torque 101, a handwheel angular position 105, a vehicle speed 109, and an optional vehicle status 113. The handwheel torque 101 may be derived from the handwheel torque sensing mechanism 43 (FIG. 1). The angular position of handwheel 16 (FIG. 1) is measured by handwheel angular position sensor 42 (FIG. 1) and may be converted into the handwheel angular position 105. In exemplary embodiments, the handwheel angular position 105 may be a scaled value derived from the relationship between the motor position commutation sensor 35 (FIG. 1) and the handwheel angular position sensor 42 (FIG. 1). Angular position refers to the rotational position of handwheel 16 (FIG. 1) indicative of a direction in which the vehicle is steered.

In addition to a handwheel torque 101 and handwheel angular position 105, the illustrative configuration of FIG. 5A utilizes a vehicle speed 109 and a vehicle status 113. The vehicle speed 109 may be determined using any device or combination of devices that are capable of detecting, determining, or outputting vehicle speed on signal line 40 (FIG. 1). The vehicle speed 109 is derived from the vehicle of FIG. 1. For example, in many vehicles, vehicle speed information is determined by a speedometer, an onboard computer, or both, and subsequently outputted on a communications bus. Other signals indicative of vehicle motion may be available through signal line 40 as well, such as handwheel velocity, vehicle acceleration, yaw rate, lateral acceleration, wheel speeds, or delta wheel speeds. Vehicle status 113 may be implemented using any device or combination of devices that are capable of detecting one or more operational faults or diagnostic conditions with respect to the vehicle. Illustratively, vehicle status 113 is implemented using an on-board vehicle computing device compliant with on board diagnostic (OBD-II) standards and capable of outputting one or more detected trouble codes (DTCs) in the event a fault condition is detected.

The handwheel torque 101, in the form of a sensed torque signal, is fed to a first input of a first summer 135, and also to an input of a first conditional lowpass filter 121. The output of first summer 135 is fed to an input of a second conditional lowpass filter 119. First conditional lowpass filter 121 is enabled by a short term enable logic circuit 123 operatively coupled to a timer 133. Second conditional lowpass filter 119 is enabled by a long term enable logic circuit 125 operatively coupled to a timer 131. The output of first conditional lowpass filter 121 is processed by a limit 129, and the output of second conditional lowpass filter 119 is processed by a limit 127. Limit 127 and limit 129 pass signals that fall within an allowable range of signal values, or pass signals that fall below a predetermined threshold, or both. The selection of the limit may be based on the magnitude of pull desired to compensate and/or to achieve a desired initial timing response. Similarly, limit 127 and limit 129 fail to pass signals that do not fall within the allowable range of signal values, or fail to pass signals that do not fall below the predetermined threshold, or both.

The output of limit 129 is fed to a first integrator 147, and the output of limit 127 is fed to a second integrator 163. The first integrator 147 may include a short term anti-windup limit (not shown). The second integrator 163 may include a long term anti-windup limit (not shown). Both the first and second integrators 147 and 163 may support initialization of past value parameters to either a zero value or a stored value. In exemplary embodiments, a past value parameter in the first integrator 147 is initialized to a zero value on ignition, a reset or other initialization event, while a past value parameter in the second integrator 163 is initialized to a stored value on ignition or other initialization event.

A short-term path is defined as including first conditional lowpass filter 121 and a first integrator 147. A long-term path is defined as including second conditional lowpass filter 119 and a second integrator 163. Illustratively, the short-term path operates continuously in real time. In exemplary embodiments, the short term path is not dependent upon the operation of the long term path; therefore, short term compensation can be enabled before long term compensation is enabled. When it is determined that the vehicle is driving along a substantially linear, straight-ahead path based upon one or more vehicle sensors (described above), the sensed torque signal is conditionally lowpass filtered. First conditional lowpass filter 121 utilized in the short term path provides a relatively fast time constant which, in one illustrative embodiment, is approximately 0.035 Hz. If straight-ahead conditions are met, indicating that the vehicle is driving along a substantially linear, straight-ahead path as determined by one or more vehicle sensors operatively coupled to short term enable logic circuit 123, the sensed torque signal is filtered.

If the straight ahead conditions are not met, then the output of first conditional lowpass filter 121, also termed "short term bias", is held to its previous value.

The short term bias is fed to the first integrator 147. If the straight-ahead conditions are met, the short term bias is integrated; otherwise, the input to first integrator 147 is set to zero and the output of first integrator 147 remains unchanged. The integrator state variable may also be reset or ramped to zero if a steering event is recognized, such as a change in vehicle heading. This is to avoid an unlearning phase due to changing vehicle heading on a windy day, or when turning off from a crowned road, for example. The short term integrator state is never stored upon vehicle shutdown wherein the vehicle ignition switch is moved to an off position. There is an additional comparison of the short term bias to a predefined minimum handwheel torque value. If the measured short term bias is less than this minimum handwheel torque value, the short term bias is not integrated by first integrator 147. This allows the ability to specify steering pull compensation only down to some predetermined minimum level of pull as, for example, 0.25 Nm. Further compensation below this minimum level may be undesirable due to possible error in readings acquired by handwheel torque sensing mechanism 43 (FIG. 1) or simply to avoid continually chasing the last few counts of error. In the exemplary embodiment, this minimum handwheel torque value is set to zero, and the apparatus of FIGS. 5A-5B attempts to compensate for any nonzero bias presented to first integrator 147.

The output of first integrator 147 is fed to a weighted gain 143 selected to achieve a desired response time, along with the previously selected time constant of first conditional lowpass filter 121. Illustratively, a gain of 0.054 is employed along with a sampling time of 0.002 seconds to achieve performance of learning 1 Nm of short term bias in approximately 25 seconds. It should be noted that, while the exemplary embodiment disclosed herein employs first integrator 147 and second integrator 163, other techniques could be used, such as a constant increment, an increment proportional to short term bias, a variable integration gain, or the like.

As stated previously, the long-term path is defined as including second conditional lowpass filter 119 and second integrator 163. The long-term path may operate in continuous time or across multiple ignition cycles. An ignition cycle is defined as starting the vehicle by activating the ignition switch, driving the vehicle, and deactivating the vehicle by switching the ignition switch to an off position. Regardless of whether the long-term path operates in continuous time or across multiple ignition cycles, the long term path is not reset during driving events, and the weighted or unweighted output of second integrator 163 is stored upon vehicle shutdown (switching the ignition switch to an off position). This stored value is only zeroed out (i.e., using a serial message on the vehicle communications bus) if the vehicle was serviced to repair the steering pull problem itself. If a continuous time approach is adopted, it is similar to the short term path, but with a longer filter time constant for second conditional lowpass filter 119 (illustratively, a cutoff frequency of approximately 0.001 Hz) and a smaller integrator gain (illustratively, 0.0015), along with a sampling time of approximately 0.064 seconds in an illustrative embodiment. The foregoing illustrative values achieve the performance of learning 1 Nm of long term bias in approximately 15 minutes.

In practice, the short term correction is quickly learned whether or not the bias is due to crowned roads, gusts of wind, or vehicle chassis issues. This is advantageous in that the vehicle driver need not wait a long time to compensate even for a long term chassis problem. Ideally, if the pull condition were present for a long period of time (because it was caused by a long term phenomenon), this correction should be moved from the short term path to the long term path. This would allow the correction to be stored upon vehicle shutdown. Then the long term path would be initialized to this value at the next ignition cycle, and the correction would not have to be relearned. In this manner, a true, long term chassis offset is learned over time and not relearned during each ignition cycle. This is appropriate because a true long term chassis offset would be present during each ignition cycle. On the other hand, corrections for crowned roads or cross winds are temporary in nature. Corrections for temporary conditions should be relearned during each ignition cycle, and possibly also relearned after detection of a steering event (i.e., turning the vehicle through a 90-degree turn).

If the short term path has already compensated for the chassis pull, there is no pull available in the sensed torque signal from the handwheel for the long term path to correct. This situation is handled by effectively removing the short term contribution from the input to the long term path before the signal is presented to second conditional lowpass filter 119. The contribution due to the short term correction value is scaled back to the appropriate input torque units using a scaled gain 149 and added to the actual measured handwheel torque at a second input of first summer 135 before second conditional lowpass filter 119. In order to properly remove only the current effect of the short term correction, any limiting due to calibrations or vehicle speed should be accounted for in the value added back in. As stated previously, the long term path can be implemented in a robust manner, allowing updates to occur over multiple ignition cycles. This technique is described in greater detail in U.S. Pat. No. 6,965,820 which is incorporated by reference herein in its entirety.

As stated previously, the first integrator 147 may include a short term anti-windup limit, and the second integrator 163 may include a long term anti-windup limit. Anti-windup limits prevent the output of, respectively, first integrator 147 and second integrator 163, from growing too large over time due to a small persistent error at the integrator input. This anti-windup limit could be set to a somewhat higher value than the allowed range of steering pull compensation, and then used for diagnostic purposes. If the learned correction grew too much larger than the allowed correction, a service lamp or check engine indicator may be illuminated to recommend vehicle service, and/or in OBD-II compliant vehicles, a newly defined DTC trouble code may be set. In one preferred embodiment, however, the anti-windup limit is selected to not exceed the desired correction for, respectively, the short term path and the long term path. The integrator output is then not allowed to exceed the desired correction term. One advantage is that, if this correction must be unlearned due to a change in driving conditions, a lengthy wait for the integrator to unwind to the level of the actual correction is avoided. If a diagnostic limit is still desired, it can be independently computed and compared with the correction value itself.

In some system applications, a vehicle manufacturer may wish to limit maximum permissible pull compensation to no greater than a predetermined value, for example 1 Nm. This will avoid masking a true vehicle problem which should be serviced. If the limit is sufficiently low (3 Nm for example), it would not be considered a safety critical contribution to the overall steering command executed by electric motor 34 (FIG. 1). If the overall compensation is desired to be limited to, say, 1 Nm, the long term path may also be limited to 1 Nm. This would allow the full compensation to eventually be moved to the stored long term path if the pull were a long term phenomenon. The short term path may also be limited to 1 Nm, or possibly up to 2 Nm. Leaving both long term and short term paths limited to the same value allows only up to that maximum correction in either path. Having a larger range on the short term path allows a full, say, 1 Nm output correction for a crowned road or a wind condition even for a vehicle that is fully long term compensated in the absence of these temporary conditions.

Unless the long term path and the short term path are each limited to half the total allowed steering pull compensation, there is a possibility that the output of first integrator 147 (for the short term path) will be larger than its current contribution. For example, consider a case where each path is limited to 1 Nm, and the overall correction is limited to 1 Nm. The short term correction may be 0.75 Nm and the long term correction may be 0.75 Nm. The sum is 1.5 Nm, but since this sum constitutes the overall correction, it is limited to 1.0 Nm. Then driving conditions may change, requiring the short term correction to decrease (i.e., the crowned road becomes flat with no change in vehicle heading). So the short term correction begins to move from 0.75 Nm towards 0 Nm. But there is no immediate effect on the output because the output was already limited to 1 Nm.

In the foregoing example, the short term correction would have to drop below 0.25 Nm before the effect of the correction is felt by a driver of the vehicle. Accordingly, in this example, the ability of the short term path to quickly assess and react to changed road conditions is not effectively utilized. While the amount of time it takes to lower the short term path output to 0.25 Nm is not long, it is nonetheless an unnecessary wait. By recognizing that the actual contribution of the short term path is not 0.75 Nm but only 0.25 Nm at the outset (the total correction less the long term correction), the anti-windup limit for short term anti-windup limit can be decreased to the lower value (0.25 Nm) so that the time it takes to unlearn upon cessation of a temporary driving condition is reduced or eliminated. Thus, if the short term contribution is ever less than what would have been computed for the short term correction, the short term anti-windup limit may be advantageously lowered to the equivalent of the actual short term contribution.

The output of first integrator 147, representing a short term path correction, is scaled into output torque units to be applied to electric motor 34 (FIG. 1) using a weighted gain 143 (FIG. 5B). If a continuously updated long term path is utilized, the output of second integrator 163, representing a long term path correction, is scaled into output torque units to be applied to electric motor 34 (FIG. 1) using a weighted gain 157 (FIG. 5B). Each weighted gain 143, 157 may employ a weighting function to weight a respective short term or long term path correction by a value from 0 to 1. Each path may employ an individual limit, but this is not necessary if the anti-windup limits are selected according to the desired ranges discussed previously.

Optionally the short term path, the long term path, or both paths may be scaled as a function of vehicle speed. This allows compensation to be ramped down to zero at zero vehicle speed since it is not necessary to compensate for a steering pull condition when the vehicle is at rest. Weighted gains 143, 157 could also be used to apply a desired compensation in each of one or more vehicle speed ranges. This feature would be useful if it could be determined how likely pull conditions would behave versus vehicle speed for a given vehicle. Such blending with vehicle speed could be performed after the outputs of weighted gains 143 and 157 are summed by a second summer 155. Alternatively, blending with vehicle speed could be performed individually on the short term path and the long term path so that the short term path contribution can be effectively known for computing an appropriate input to the long term path as described previously.

The short term and long term path corrections are determined with all associated scaling and limits applied at scaled gain 149, weighted gain 143, and weighted gain 157. These two contributions, from the long term and short term paths, are summed into a pull compensation offset signal 153 by second summer 155. Limit 151 limits the value of pull compensation offset signal to the allowed compensation value discussed previously. Pull compensation offset signal 153 is summed with an electric power steering torque command for application to electric motor 34 (FIG. 1). Returning now to FIG. 5B, if diagnostics were required, an unlimited pull compensation offset signal at the output of second summer 155 (or an unlimited pull compensation signal computed independently) would be compared to the limited pull compensation offset signal 153 at the output of limit 151. If the unlimited compensation signal exceeded a predefined value, a fault indicator or check engine lamp may be illuminated, or pull compensation offset signal 153 gradually reduced towards zero, or the current pull compensation offset signal 153 simply held to its present value indefinitely. Any of these conditions would eventually alert the driver to service their vehicle. Any stored long term value would be reset to zero during this service.

Pursuant to an alternate embodiment, only the short term path shown in FIGS. 5A-5B is utilized, and the long term path is eliminated or not used. Since the short term path quickly learns corrections even for chassis issues, it could be used exclusively to compensate for both short term conditions (crowned roads, cross winds), and long term conditions (vehicle chassis issues). In such an alternate embodiment, the short term path correction could, but need not, be stored over multiple ignition cycles. However, if the correction is not stored over multiple ignition cycles, this would eliminate the need to reset the long term path correction after the vehicle is serviced. If satisfactory performance is achieved simply via the short term path, and the learning time is sufficiently short, this alternate embodiment is a viable option.

Conversely, pursuant to another alternate embodiment, only the long term path shown in FIGS. 5A-5B is utilized, and the short term path is eliminated or not used. For example, it may be desired to only compensate for vehicle chassis problems, and not attempt to correct for temporary conditions such as crowned roads and cross winds. This implementation could be performed continuously, in real time, optionally using an even slower time constant for second conditional lowpass filter 119 (FIG. 5A) than what was described previously, and optionally using an even lower gain for second integrator 163 than what was described previously. Optionally, long term path compensation may be delayed or calculated over multiple ignition cycles.

Pursuant to yet another alternate embodiment, steering pull compensation is driver selectable. Under these circumstances, steering pull compensation may be automatically disabled at ignition on. The feature would be enabled, for example, by pressing a momentary contact, spring loaded, or rocker switch which, when pressed, causes visual feedback to be provided in the form of an indicator lamp. The steering compensation system shown in FIGS. 5A and 5B may be configured so that the driver can enable or disable the entire compensation function, or merely just enable or disable the short term path or the long term path correction. If the driver disabled the entire compensation function, re-enabling the function may or may not cause the learned long term path correction to be reset to zero, depending upon customer requirements. If re-enabling does reset the learned long term path correction to zero, it would eliminate the need for special service procedures to reset the long term path correction via a serial message on the vehicle communications bus. Another approach to eliminating the need for special service procedures is to have a driver-initiated sequence of events reset the long term path correction. For example, resetting the long term path correction could be performed in response to the driver resetting a change oil indicator on the vehicle.

Figure 6:
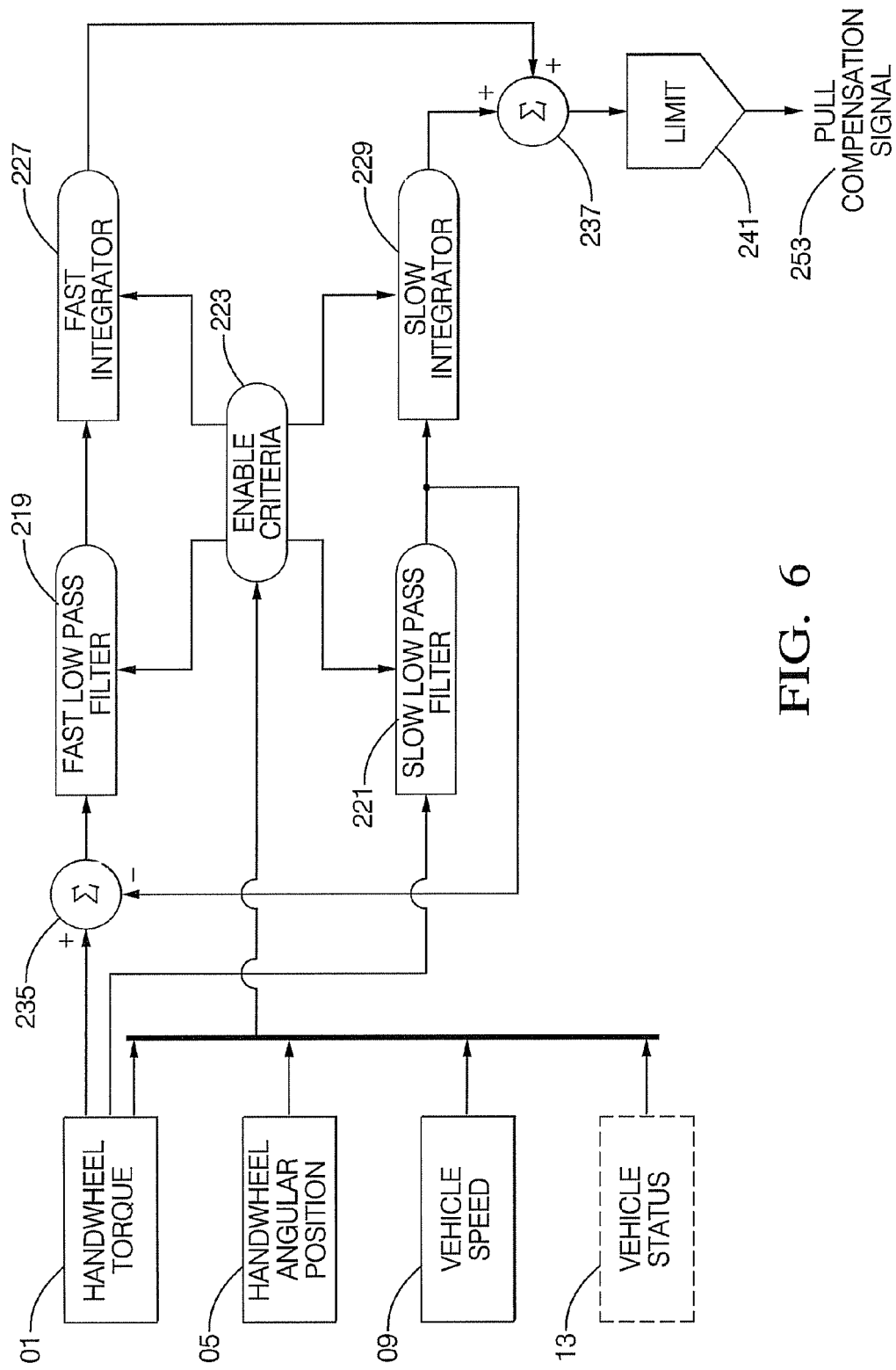
FIG. 6 is a block diagram of a system for providing steering pull compensation according to a fourth set of exemplary embodiments disclosed herein.

FIG. 6 is a block diagram of a system for providing steering pull compensation according to a fourth set of embodiments disclosed herein. This approach separates a sensed torque signal based upon frequency components contained within the signal. The sensed torque signal is provided by the handwheel torque 101 as derived from handwheel torque sensing mechanism 43 (FIG. 1). The sensed torque signal is fed to an input of a slow lowpass filter 221 which conditionally filters the signal based upon one or more conditions sensed by handwheel torque sensing mechanism 43 (FIG. 1), the handwheel angular position 105, vehicle speed 109, and/or vehicle status 113. These one or more sensed conditions are processed by an enable criteria logic circuit 223 which enables slow lowpass filter 221, a fast lowpass filter 219, a fast integrator 227, and a slow integrator 229, when the one or more sensed conditions are indicative of the vehicle proceeding forward along a substantially linear, straight-ahead path.

Slow lowpass filter 221 is designed to have a cutoff frequency sufficient for separating long term (lower frequency) phenomena from the sensed torque signal. The output of slow lowpass filter 221, representing handwheel torque in a lower frequency range, is presented to slow integrator 229 which has the effect of correcting or adjusting the output of slow lowpass filter 221 over time. More specifically, any nonzero value in this low frequency range is integrated to compute a long term correction.

The total handwheel torque, less the low frequency filtered output, is a remaining component of driver-applied handwheel torque which has yet to be examined for correction. This remaining component, developed by subtracting the output of the slow lowpass filter 221 from the sensed torque signal at a first summer 235, is fed to an input of fast lowpass filter 219. Fast lowpass filter 219 filters the remaining component if, as discussed previously, the fast lowpass filter is enabled by enable criteria logic circuitry 223. A cutoff frequency for fast lowpass filter 219 is selected which is higher than the cutoff frequency of slow lowpass filter 221. The cutoff frequency of fast lowpass filter 219 is chosen to include short term steering pull contributions such as transitioning to a crowned road or experiencing a cross wind. The output of fast lowpass filter 219 is presented to slow integrator 229 for possible correction or further refinement.

Fast lowpass filter 219 and fast integrator 227 form a short term path which generates an output in the form of a short term correction. This short term correction is independent of a long term correction generated by a long term path that includes slow lowpass filter 221 and slow integrator 229. A second summer 237 sums the long term correction generated at the output of slow integrator 229 with the short term correction generated at the output of fast integrator 227. The output of second summer 237 represents a total correction. However, the concepts discussed previously in connection with FIGS. 5A and 5B, including determining the straight-ahead condition, weighting, limiting, scaling to output units, and scaling with vehicle speed still apply. Accordingly, the output of second summer 237 may be fed to a limit 241 for limiting the total correction to a predetermined range, or for limiting the magnitude of the total correction to less than a predetermined threshold. Of course, the concept of removing or subtracting short term effects, previously discussed in the context of FIGS. 5A and 5B, is not necessary in the configuration of FIG. 6.

Figure 7:
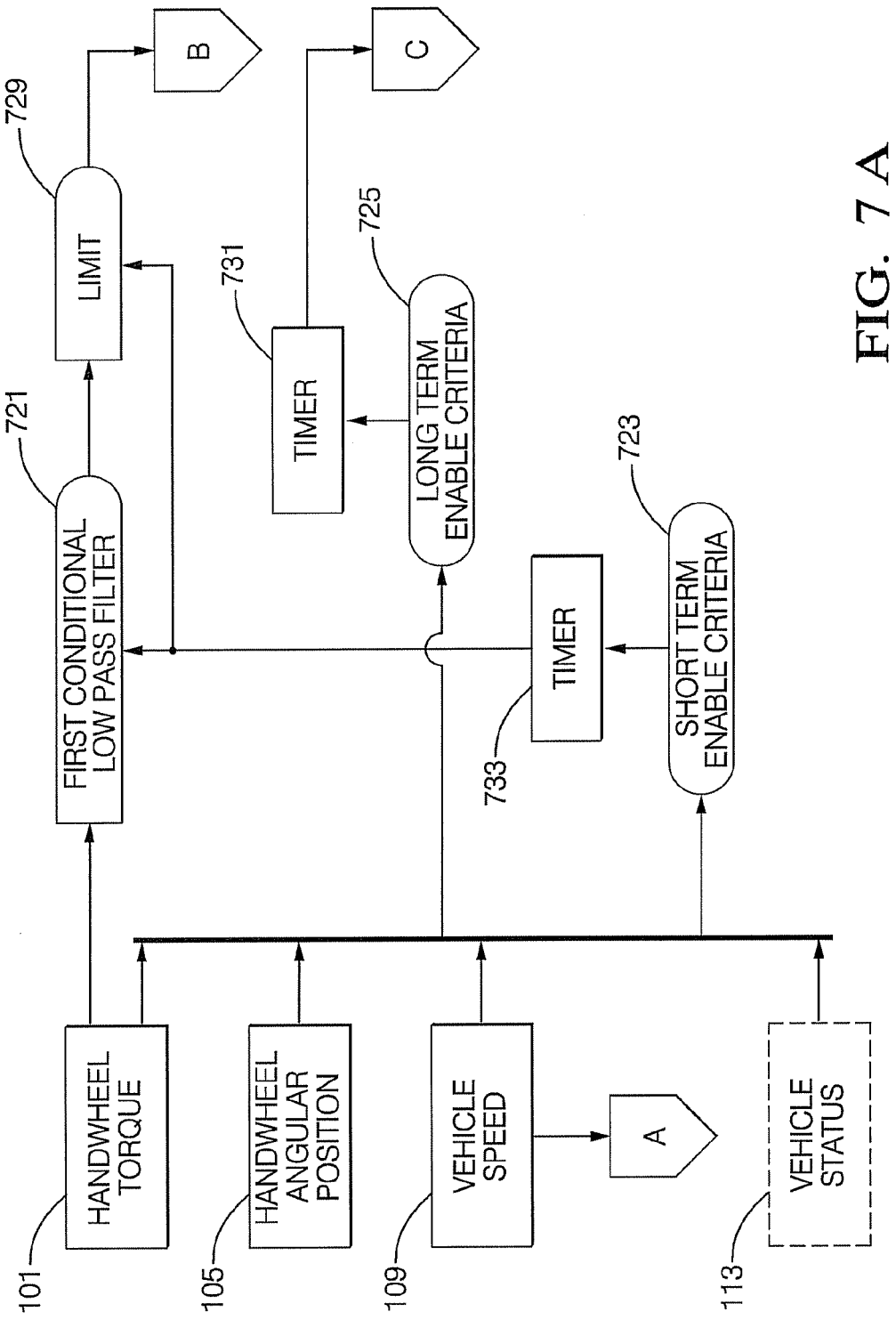
FIGS. 7A and 7B together comprise a block diagram of a system for providing steering pull compensation according to a fifth set of exemplary embodiments disclosed herein.
Figure 7B:
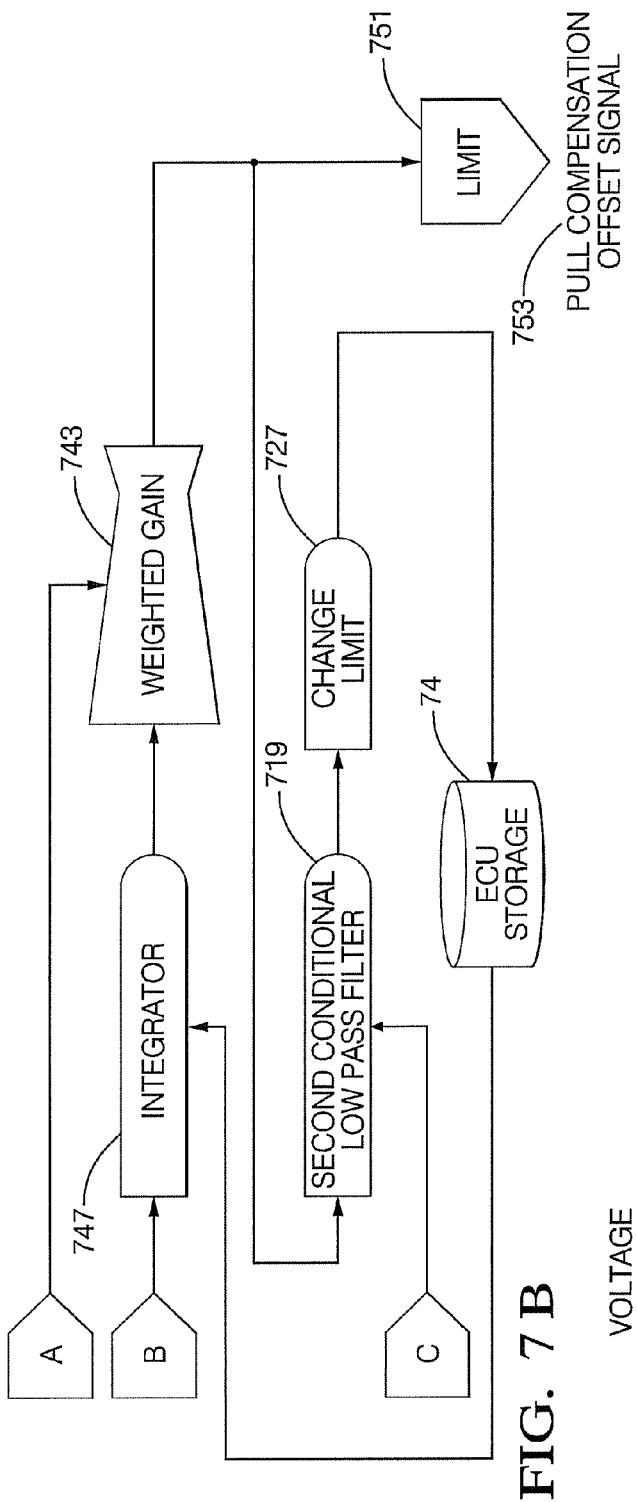

FIGS. 7A and 7B together comprise a block diagram of a system for providing steering pull compensation according to a fifth set of embodiments disclosed herein. The system depicted in FIGS. 7A and 7B are an alternate embodiment similar to FIGS. 5A and 5B, but with improved computational efficiency. The system enables computation of both a short term and a long term contribution in a single path. The short term path is similar to that previously described in FIGS. 5A and 5B.

The system of FIGS. 7A and 7B includes one or more vehicle inputs such as a handwheel torque 101, a handwheel angular position 105, a vehicle speed 109, and an optional vehicle status 113. The handwheel torque 101, in the form of a sensed torque signal, is an input to a first conditional lowpass filter 721. The first conditional lowpass filter 721 is enabled by a short term enable logic circuit 723 operatively coupled to a timer 733. A second conditional lowpass filter 719 is enabled by a long term enable logic circuit 725 operatively coupled to a timer 731. The output of first conditional lowpass filter 721 is processed by a limit 729, and the output of second conditional lowpass filter 719 is processed by a change limit 727. Limit 729 passes signals that fall within an allowable range of signal values, or pass signals that fall below a predetermined threshold, or both. Similarly, limit 729 fails to pass signals that do not fall within the allowable range of signal values, or fail to pass signals that do not fall below the predetermined threshold, or both. The change limit 727 restricts filtered long term pull compensation values into step size change effect increments. The step size change effect increments may be stored in ECU storage 74 either directly or incrementally by adding the step size change effect increments to the previously stored past value.

The output of limit 729 is fed to an integrator 747, which may include a short term anti-windup limit (not shown). The integrator 747 supports initialization of past value parameters to either a zero value or a stored value. In exemplary embodiments, a past value parameter in the integrator 747 is initialized to the stored long term limited calculation value on a reset or other initialization event.

The output of the integrator 747 is fed to a weighted gain 743 selected to achieve a desired response time, along with the previously selected time constant of first conditional lowpass filter 721. It should be noted that, while the exemplary embodiment disclosed herein employs the integrator 747, other techniques could be used, such as a constant increment, an increment proportional to short term bias, a variable integration gain, or the like. The output of the integrator 747, representing a short term path correction, is scaled into output torque units to be applied to electric motor 34 (FIG. 1) using the weighted gain 743 (FIG. 7B). The weighted gain 743 may employ a weighting function to weight a respective short term path correction by a value from 0 to 1. Optionally, the short term path may be scaled as a function of vehicle speed. A limit 751 limits the value of the weighted gain 743 that is output as a pull compensation offset signal 753.

If a short term calculation persists over time, it can be learned as a long term contribution by putting the short term calculation through a slow low pass filter, i.e. the second conditional lowpass filter 719. Thus, the output of the weighted gain 743 may be fed to the second conditional lowpass filter 719 to produce a long term contribution. The long term contribution is not used to directly produce a pull compensation offset signal 753; rather, the long term contribution is stored in non-volatile memory, such as ECU storage 74. The long term contribution value may be limited in magnitude per ignition cycle to achieve further robustness through the change limit 727. This helps ensure that only true long term effects will be stored by storing only a small step toward the desired value. The allowed change may be unlimited in step size for a non-robust, more responsive design. As previously stated, the short term path is initialized to the stored value long term value at the start of the next ignition cycle. If a short term reset is required, it may be reset to the long term value, instead of reset to zero. Thus exemplary embodiments depicted in FIGS. 7A and 7B provide the essential functionality of the embodiments depicted in FIGS. 5A and 5B, with lower computational complexity.

Figure 8:
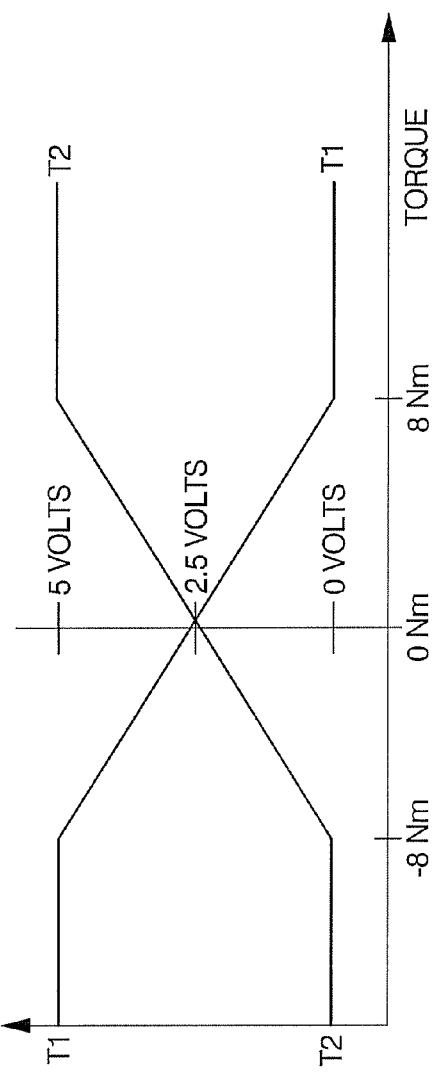
FIG. 8 is a graphical representation of voltage as a function of torque for an illustrative implementation of the handwheel torque sensing mechanism depicted in FIGS. 1, 5A, 6, and 7A.

FIG. 8 is a graphical representation of voltage as a function of torque for an illustrative implementation of handwheel torque sensing mechanism 43 depicted in FIG. 1, and used in FIGS. 2, 5A, 6, and 7A. The graphical representation of FIG. 8 is presented only for purposes of illustration, as those having ordinary skill in the relevant art will appreciate that any of various structures, devices, or configurations may be utilized to implement torque sensing mechanism 43, and such structures, devices, or configurations may or may not provide outputs as shown in FIG. 8.

In the example of FIG. 8, handwheel torque sensing mechanism generates two voltage outputs denoted as T1 and T2. Torque, shown along the X axis, is 0 Nm when handwheel 16 (FIG. 1) is at rest, with no force being applied thereto. Under these conditions, voltage T1 and voltage T2 are both substantially equal to +2.5 volts. As force is applied to the handwheel in an attempt to rotate the handwheel either to the left or to the right, handwheel torque increases. When force is applied to the handwheel to pull the handwheel to the left, this corresponds to an applied torque within the range of 0 Nm to approximately −8 Nm. At the −8 Nm limit, voltage T1 reaches a maximum of +5 volts, and voltage T2 reaches a minimum of 0 volts. On the other hand, when force is applied to the handwheel to pull the handwheel to the right, the applied handwheel torque may be in the range of 0 Nm to approximately +8 Nm. At the 8 Nm limit, voltage T1 reaches a minimum of 0 volts, and voltage T2 reaches a maximum of +5 volts. It is to be understood that specific values of voltages and forces are presented in FIG. 8 only for purposes of illustration.

Figure 9:
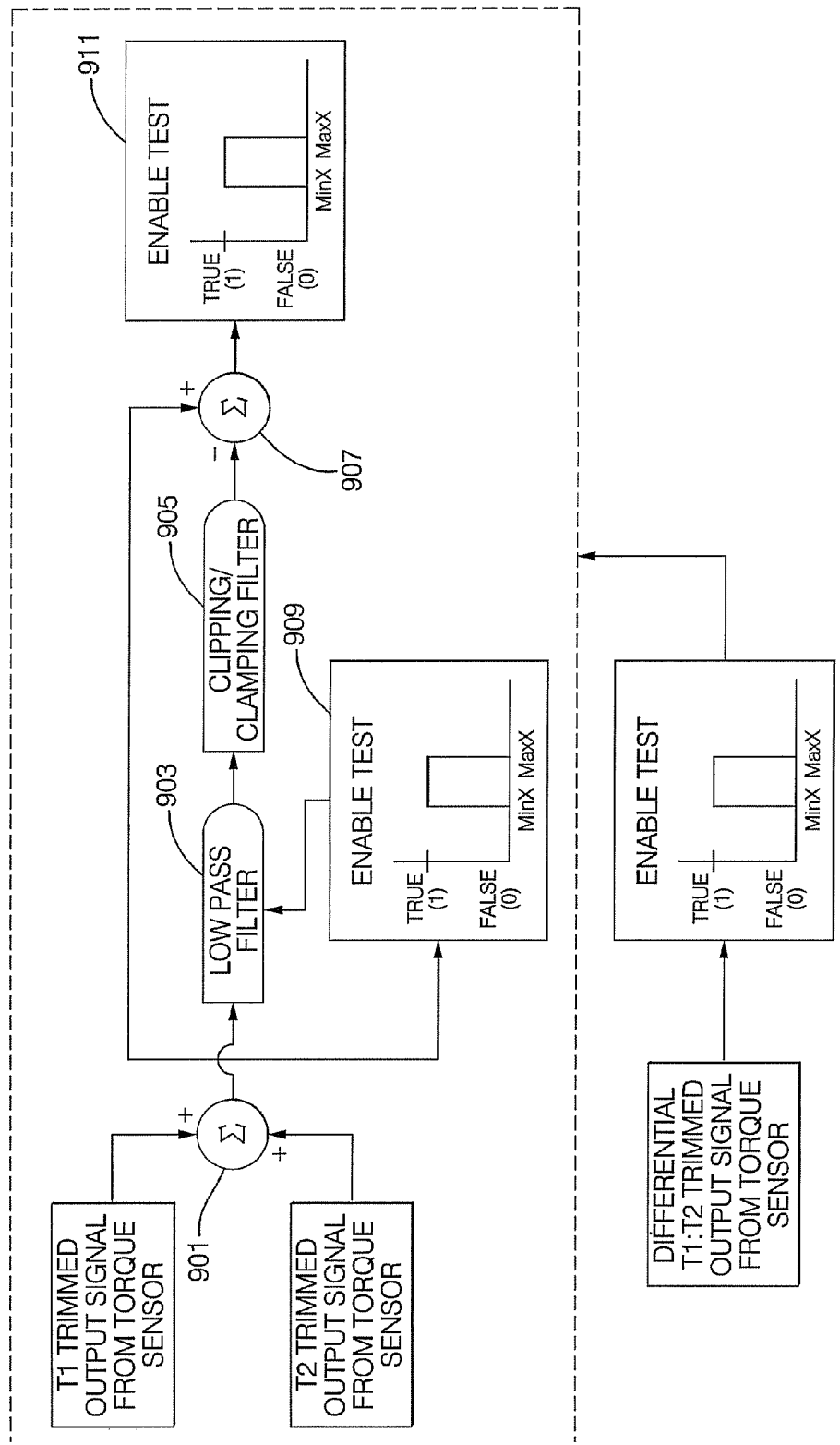
FIG. 9 is a block diagram of an exemplary system for determining the noise level of a sensed torque signal for use with a handwheel torque sensing mechanism that provides an output as depicted in FIG. 8.

FIG. 9 is a block diagram of a system for determining the noise level of a sensed torque signal for use with a handwheel torque sensing mechanism that provides an output as depicted in FIG. 8. Pursuant to the scenarios described previously in conjunction with FIGS. 5A, 5B, 6, 7A, and 7B, a bias torque may be determined to exist at handwheel 16 (FIG. 1) by monitoring the sensed torque signal during conditions when the vehicle is likely traveling along a substantially linear, straight-ahead path. Accordingly, under some circumstances, it may be desirable to ascertain whether or not there is too much noise on the sensed torque signal which, if present, would result in the wrong value of bias being learned and compensated.

With reference to FIG. 8, the sensed torque signal includes two components, T1 and T2. Note that, regardless of the amount of force applied to the handwheel, the sum of T1 and T2 is nominally 5 volts. This behavior can be used to diagnose handwheel torque sensing mechanism 43 (FIG. 1) for the purpose of determining whether or not the sensed torque signal provided by the torque sensing mechanism is unacceptably noisy for use in steering pull compensation.

Referring now to FIG. 9, handwheel torque sensing mechanism 43 (FIG. 1) provides a sensed torque signal in the form of two voltages, T1 and T2, which are summed by a first summer 901. The output of first summer 901 is fed to an input of a lowpass filter 903. Lowpass filter 903 is enabled only when the sum produced by summer 901 is within a predetermined, as indicated by enable test 909. This predetermined range is denoted as {MinX, MaxX}. Lowpass filter 903 may be initialized with a nominal or expected value. The output of lowpass filter 903 is limited by a clipping/clamping filter 905. A second summer 907 subtracts this limited output from the output of first summer 901. The output of clipping/clamping filter 905 represents a long term average of the sum of T1 and T2. In practice, there will be a noise component riding on T1 and T2. If the noise becomes large, the difference between the filtered signal at the output of clipping/clamping filter 905 and the output of first summer 901 will become large. This error term is compared to an acceptable range at enable test 911. If the difference between the filtered signal and the output of first summer 901 is within the acceptable range, the sensed torque signal is valid for use with pull compensation. If the difference between the filtered signal and the output of first summer 901 is larger than the acceptable range, then pull compensation is disabled.

Figure 10:
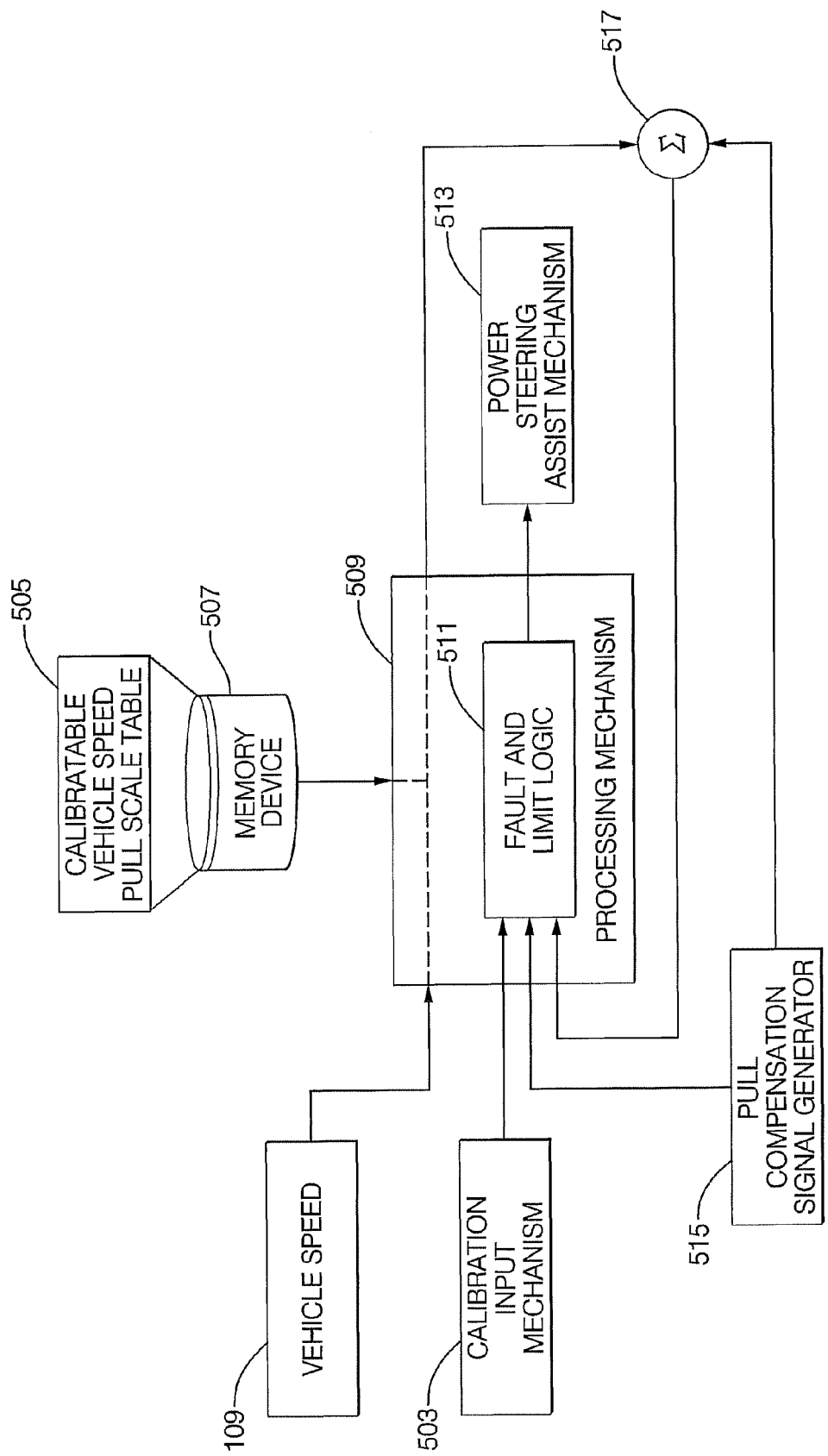
FIG. 10 is a block diagram of a system for providing steering pull compensation according to a sixth set of exemplary embodiments disclosed herein.

FIG. 10 is a block diagram of a system for providing steering pull compensation according to a sixth set of embodiments disclosed herein. The system uses an optional input device in the form of a calibration input mechanism 503 to apply a predetermined compensation value to a power assist steering motor 513 controlled by a processing mechanism 509. Calibration input mechanism 503 may include any of a keypad device, a touch-screen display, a personal computer, a microprocessor-based device, or one or more switches. If optional calibration input mechanism 503 is not used, the system of FIG. 10 applies steering pull compensation in a passive manner.

Processing mechanism 509 includes fault and limit logic 511 for limiting and controlling the range of motion of power assist steering motor 513. Processing mechanism 509 is capable of receiving inputs such as a vehicle speed 109 input, calibration input mechanism 503 input, and a pull compensation signal generator 515 input. Processing mechanism 509 is programmed to access a calibratable vehicle speed pull scale table 505 stored in a memory device 507. Memory device 507 may be external to processing mechanism 509, integrated within processing mechanism 509, or both. In exemplary embodiments, the memory device 507 may be the ECU storage 74 (FIG. 2), the processing mechanism 509 may be included in the controller 32 (FIG. 1), and the power steering assist motor 513 may be the electric motor 34 (FIG. 1).

Based upon optional input received at calibration input mechanism 503, processing mechanism 509 accesses memory device 507 to retrieve one or more appropriate values from calibratable vehicle speed pull scale table, based upon input received from vehicle speed sensor 109. The retrieved value or values are multiplied by the output of pull compensation generator 515 using a multiplier 517 to generate a drive signal for power assist steering motor 513. Before the drive signal is applied to power assist steering motor 513, the signal is processed by fault and limit logic 511.

The system of FIG. 10 does not require any "learning" of a steering pull condition. This system may be advantageously exploited in situations where it is desired to null out an existing steering pull condition. This might be diagnosed and compensated for during vehicle assembly or service, via vehicle evaluation or rolling alignment. The correction could be scaled with vehicle speed, as is shown in the illustrative example of FIG. 10, but scaling the correction with vehicle speed is not necessary.

Using calibration input mechanism 503, a driver is provided with the capability of selecting or specifying an amount of desired steering pull compensation. In some system applications, it may be desirable to limit the amount of selectable or specified compensation to ensure that the user does not create a dangerous driving condition. For example, the maximum permissible compensation could be limited to 3 Nm or less. This would allow a driver to adjust the compensation setting as required according to vehicle loading, driving conditions, and other factors. If the driver detected a small but persistent pull in the vehicle, the driver could simply dial in a small amount of correction in order to avoid the inconvenience of vehicle service. If the pull increased beyond a programmed or predefined limit, the driver would then have to address the pull issue via service. Or, if the driver drives often on crowned roads, which are common in many areas to provide for enhanced water runoff and drainage, the driver could dial in a little compensation to account for the crown and not be required to provide the extra handwheel torque via manual effort.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method of providing compensation for steering pull in a vehicle steering system that includes a handwheel, the method including:
   monitoring the vehicle to determine whether the vehicle is heading forward along a substantially linear straight-ahead path and, if so:
      measuring handwheel torque, as a sensed torque signal, to determine an amount of steering pull existing at the handwheel;
      generating a torque assist signal in response to the sensed torque signal;
      calculating an offset signal for reducing the amount of steering pull to substantially zero by; integrating the sensed torque signal to produce a short term compensation signal; integrating a sum of the sensed torque signal and the short term compensation signal to produce a long term compensation signal; and summing the short term compensation signal and the long term compensation signal to produce the offset signal;
      producing a modified torque assist signal by adding the offset signal to the torque assist signal; and
      applying the modified torque assist signal to the vehicle steering system.

2. The method of claim 1, wherein monitoring the vehicle to determine whether the vehicle is heading forward along a substantially linear straight-ahead path comprises monitoring at least one of: a torque applied to the handwheel, a handwheel angular position, a vehicle speed, a handwheel velocity, a delta vehicle speed, a yaw rate, a lateral acceleration, wheel speeds, and delta wheel speeds.

3. The method of claim 1, wherein calculating the offset signal further comprises:
   lowpass filtering the sensed torque signal using a first lowpass filter having a first time constant prior to integrating the sensed torque signal to produce the short term compensation signal.

4. The method of claim 3, wherein calculating the offset signal further comprises:
   lowpass filtering the sum of the sensed torque signal and the short term compensation signal using a second lowpass filter having a second time constant longer than the first time constant prior to integrating the sum of the sensed torque signal and the short term compensation signal to produce a long term compensation signal.

5. The method of claim 1, wherein the offset signal is limited by a limit function.

6. The method of claim 1, wherein applying the modified torque assist signal to the vehicle steering system further comprises applying the modified torque assist signal to a motor capable of providing a torque assist force to the vehicle steering system.

7. The method of claim 3, wherein the short term compensation signal is reset upon an occurrence of a significant driving maneuver comprising at least one of a right-hand turn, a left-hand turn, and braking to a stop.

8. A controller for a vehicular steering system that includes a handwheel for steering the vehicle, a torque sensing mechanism for sensing torque applied to the handwheel and providing a sensed torque signal in response thereto, an angular position sensor for sensing an angular position of the handwheel and providing an angular position sensor output in response thereto, a vehicle speed sensor capable of acquiring vehicle speed, and a motor which provides assist torque to the steering system, the controller including:
   a torque assist function responsive to the sensed torque signal for providing a torque assist command to the motor; and
   a steering pull compensator for modifying the torque assist command to the motor by an offset signal corresponding to a detected steering pull condition;
   wherein the steering pull compensator includes a first lowpass filter operatively coupled to a first integrator for generating a short term compensation signal from the sensed torque signal passing through the first lowpass filter and the first integrator, a second lowpass filter operatively coupled to a second integrator for generating a long term compensation signal from a sum of the short term compensation signal and the sensed torque signal passing through the second lowpass filter and the second integrator, and a combiner for combining the short term compensation signal and the long term compensation signal to generate the offset signal;

wherein the first lowpass filter has a first time constant, and the second lowpass filter has a second time constant longer than the first time constant;

wherein the first integrator has a first gain, and the second integrator has a second gain less than the first gain; and wherein the first and second lowpass filters are enabled in response to the vehicle traveling forward along a substantially linear straight-ahead path as determined by at least one of the sensed torque signal, the angular position sensor output, and the acquired vehicle speed.

9. The controller of claim 8, wherein traveling forward along a substantially linear straight-ahead path is further determined by at least one of: a handwheel velocity, a delta vehicle speed, a yaw rate, a lateral acceleration, wheel speeds, and delta wheel speeds.

10. The controller of claim 8, wherein the short term compensation signal provides steering pull compensation for a temporary condition including at least one of crowned roads, non-level roads, crosswinds, and vehicle loading; and wherein the long term compensation signal provides steering pull compensation for a vehicle condition including at least one of vehicle chassis misalignment, front-end alignment, improperly inflated tires, irregularly worn tires, and tires having defective ply.

11. The controller of claim 8, wherein at least one of the short term compensation signal and the long term compensation signal is limited prior to generating the offset signal.

12. The controller of claim 8, wherein the long term compensation signal is stored for use in a plurality of ignition cycles, each cycle comprising activating an ignition mechanism to start the vehicle, driving the vehicle, and then switching the ignition mechanism to an off position.

13. The controller of claim 8, wherein the inputs to the first and second integrators are set to zero when the first and second lowpass filters are disabled.

14. The controller of claim 8, wherein at least one of a fixed short term compensation signal and a fixed long term compensation signal is user programmable.

15. The method of claim 1 further comprising: filtering the sensed torque signal and determining from results of the filtering whether the noise level of the sensed torque signal is acceptable through a range check before using the sensed torque signal to generate the offset signal.

16. The controller of claim 8 wherein the sensed torque signal is filtered and results of the filtering are used to determining whether the noise level of the sensed torque signal is acceptable through a range check before using the sensed torque signal to generate the offset signal.

* * * * *